US011836238B2

(12) United States Patent
Nakamura

(10) Patent No.: US 11,836,238 B2
(45) Date of Patent: Dec. 5, 2023

(54) EXECUTION DEVICE, INSTRUCTION DEVICE, METHOD EXECUTED BY SAME, AND COMPUTER PROGRAM

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 491 days.

(21) Appl. No.: 16/613,231

(22) PCT Filed: May 21, 2018

(86) PCT No.: PCT/JP2018/019454
§ 371 (c)(1),
(2) Date: Apr. 22, 2020

(87) PCT Pub. No.: WO2018/212357
PCT Pub. Date: Nov. 22, 2018

(65) Prior Publication Data
US 2020/0279037 A1 Sep. 3, 2020

(30) Foreign Application Priority Data
May 19, 2017 (JP) ................................. 2017-100117

(51) Int. Cl.
*G06F 21/35* (2013.01)
*G06F 21/60* (2013.01)
(Continued)

(52) U.S. Cl.
CPC ............ *G06F 21/35* (2013.01); *G06F 21/602* (2013.01); *G06K 19/06037* (2013.01); *G07C 9/00174* (2013.01); *G06F 2221/0751* (2013.01)

(58) Field of Classification Search
CPC ........ G06F 21/602; G06F 21/45; G06F 21/64; G06F 21/6209; G06F 21/35;
(Continued)

(56) References Cited

U.S. PATENT DOCUMENTS

| 2007/0237136 A1* | 10/2007 | Sako | G06F 16/4387 707/E17.143 |
| 2010/0266132 A1* | 10/2010 | Bablani | H04W 12/128 380/286 |

(Continued)

FOREIGN PATENT DOCUMENTS

| EP | 2743868 A1 * | 6/2014 | ......... G07C 9/00857 |
| JP | 2001351155 A | 12/2001 | |

(Continued)

OTHER PUBLICATIONS

Matsukawa et al., "Automatic Passenger Gate System Using Contactless IC Card", vol. 18, No. 4, Nippon Signal Technical Journal, Oct. 31, 1994, 16 pages.

(Continued)

*Primary Examiner* — Abiy Getachew
(74) *Attorney, Agent, or Firm* — Edell, Shapiro & Finnan, LLC

(57) ABSTRACT

A technique for preventing a man in the middle attack is proposed. A security gate system includes an admission card and a security gate apparatus. The admission card has condition data that is data for specifying a condition to be satisfied when or before or after encrypted authentication data are transferred from the admission card to the security gate apparatus. When a user attempts to enter a building, authentication data including condition data are generated in the admission card 100 (S802), and encrypted into encrypted authentication data (S803). The encrypted authentication data are transmitted from the admission card to the security gate apparatus (S804, S904), and decrypted to be returned to the authentication data (S905). The security gate apparatus performs authentication determination which is a determination as to whether a condition specified by the condition data included in the authentication data is satisfied (S906), and opens a gate plate when a determination result is positive (S907).

12 Claims, 9 Drawing Sheets

(51) Int. Cl.
*G06K 19/06* (2006.01)
*G07C 9/00* (2020.01)

(58) Field of Classification Search
CPC ...... G06F 2221/0751; G06K 19/06037; G07C 9/00174; G07C 9/00309; H04L 63/0853; H04L 9/32
See application file for complete search history.

(56) References Cited

U.S. PATENT DOCUMENTS

| | | | | |
|---|---|---|---|---|
| 2011/0072500 | A1* | 3/2011 | Varghese | G06F 21/32 |
| | | | | 726/7 |
| 2015/0040212 | A1* | 2/2015 | Kim | A61B 5/002 |
| | | | | 726/19 |
| 2015/0262156 | A1* | 9/2015 | Sakoda | H04W 4/00 |
| | | | | 705/40 |
| 2015/0278814 | A1* | 10/2015 | Jaffe | G06Q 20/3823 |
| | | | | 705/44 |
| 2020/0153841 | A1* | 5/2020 | Scheinuk | H04L 63/123 |
| 2021/0234693 | A1* | 7/2021 | Kurian | H04L 9/088 |

FOREIGN PATENT DOCUMENTS

| | | |
|---|---|---|
| JP | 2015504492 A | 2/2015 |
| JP | 2018035515 A | 3/2018 |

OTHER PUBLICATIONS

International Search Report, PCT/JP2018/019454, dated Nov. 5, 2018, 2 pages.

* cited by examiner

EXECUTION DEVICE, INSTRUCTION DEVICE, METHOD EXECUTED BY SAME, AND COMPUTER PROGRAM

TECHNICAL FIELD

The present invention relates to an authentication technique that can be applied, for example, to electronic locks.

BACKGROUND ART

The authentication technique is applied to, for example, electronic locks, and the electronic locks are applied to various objects, for example, locks for automobiles.

The electronic locks used for automobiles are as follows.

An electronic lock for an automobile includes a locking device provided on an automobile side, and a key device held by a user. The key device is configured to be capable of generating key data corresponding to a key in a general lock. Furthermore, the key device is configured to be capable of transmitting the key data to the locking device, for example, wirelessly. The locking device receives the key data from the key device, and determines whether the key data is authentic. This determination may be grasped as "authentication" processing. When the key data is determined to be authentic in any case, the locking device unlocks the door of an automobile.

When electronic locks began to appear, only one type of key data was generated by a key device (or stored in the key device). Therefore, in the case of such an electronic lock, the same key data was always transferred from a key device to a locking device, and the door of an automobile were unlocked based on the determination as to authenticity of the key data (for example, when the key data provided from the key device to the locking device was coincident with key data held from the beginning in the locking device, it was determined that the key data provided from the key device to the locking device was authentic). Of course, if the key data is always the same, it is easy for a malicious third party to know the key data and also duplicate the key device capable of transmitting the key data. Therefore, there has been a problem of theft of automobiles caused by unauthorized unlocking of the doors of the automobiles using duplicated key devices.

In order to prevent such a problem, there was thereafter developed a technique in which a large number of key data were stored in advance in the key device, and one of the large number of key data was transmitted from the key device to the locking device every time it was necessary to unlock the door of the automobile. However, the number of key data to be recorded in advance in the key device was limited although there were a large number of key data. Therefore, if all of the key data recorded in the key device were stolen by a malicious third party, the problem of theft of automobiles still occurred.

Furthermore, there has already been practically used a technique in which a key data generating device for generating different key data one after another is incorporated in the key device without having stored key data in the key device, and key data generated newly in the key data generating device is transmitted from the key device to the locking device every time it is required to unlock the door of an automobile.

The key data in this case is something like a one-time password that can be used only for some time after it is generated in the key device. In the case of use of such key data, even if the key data is stolen by a malicious third party, the key data is immediately invalidated, so that there is little possibility that the malicious third party can steal an automobile by using the stolen key data, which has been believed at least so far. In particular, in the case of use of such key data, the key data generating device as described above is incorporated in the key device, and also a key data generating device which is different from the foregoing key data generating device and can generate, one after another, the same key data as generated in the key data generating device incorporated in the key device is required to be provided on the locking device side. However, it has been believed that by complicating a method used to generate the key data with the key data generating devices incorporated in the key device and locking device respectively, a malicious third party would be virtually incapable of acquiring the next key data to be used, so that theft of an automobile caused by unlocking of the door of the automobile with an unauthorized key data should not occur in theory.

SUMMARY OF INVENTION

Technical Problem

However, even when key data such as the one-time password described above is used, there has occurred a situation in which the door of an automobile is illegally unlocked and the automobile is stolen. This has been done by a very simple method described below.

For example, it is assumed that a key device is present at a place away from an automobile. For example, a malicious third party operates the key device or the like to cause a key data generating device incorporated in the key device to generate key data, and directly obtains the key data transmitted from the key device on radio waves, for example.

Then, the radio wave carrying the key data is transmitted near the target automobile by using an appropriate device. In this case, a locking device mounted on the automobile that has received the key data by receiving the radio wave determines that the key data is authentic, and unlocks the lock provided on the door of the automobile. As a result, the automobile has been stolen.

The characteristic of this automobile theft method is in that a malicious third party entirely steals key data that was legitimately created with a legitimate key device, whereby the malicious third part can steal an automobile without knowing the content of the key data at all. In other words, the malicious third party executing this theft method neither needs to know the content of the key data nor needs to know how the key data is generated. In addition, even if the key data transferred from the key device to the locking device is encrypted, and further even if processing used for the encryption of the key data is so advanced that the malicious third party cannot decrypt it, they does not affect the conclusion that malicious third party can steal the automobile.

A method of committing a crime by entirely stealing legitimate authentication data created legitimately by a legitimate device as described above is generally called a man in the middle attack (MITM).

The man in the middle attack is a technique for enabling impersonation in authentication. In general, this technique has a very troublesome property that it cannot be prevented even by enhancing the complexity of processing to be executed on an authenticating side and an authenticated side, for example, the foregoing processing for generation of the key data as much as possible, and also even by enhancing the level of encryption of data to be transferred for authentication from the authenticating side to the authenticated side as much as possible.

Of course, the man in the middle attacks is not a problem inherent in electronic locks for automobiles. For example, it is general in recent buildings that a security check using an admission card having an IC chip embedded therein is performed at entrances to the buildings. In a typical example, an authentication device including a card reader for reading an IC chip of an admission card, and a gate which is to be opened when data read out by the card reader are authentic are provided in pair at an entrance to a building. In such a security check mechanism, when an authentic admission card is put on the card reader and the authentication device determines that authentication data passed from the IC chip of the admission card to the card reader is authentic, the gate is opened, and an owner of the admission card is allowed to pass through the gate. However, in the case where the admission card is in the hands of a malicious third party, for example, due to theft, the malicious third party could pass through the gate even if authentication data recorded in an IC chip or generated in the IC chip is elaborated as much as possible, or even if an authentication device including a card reader is elaborated as much as possible, or even if an encryption technique whose level is as high as possible is used when authentication data is transmitted from the IC chip of the admission card to the card reader of the authentication device.

In fact, there is no way to deal with man in the middle attack. Even among security experts, it is an implicit understanding that the man in the middle attack is an attack that cannot be prevented, and thus should be ignored or refused to talk about its possibility.

The invention has an object to provide a technique that can defend a man in the middle attack in a specific case.

Solution to Problem

In order to solve the above problem, the inventor of the present application has proposed an invention described below.

The invention of the present application is an execution device that is used in combination with an instruction device that is a device capable of transferring an instruction serving as a trigger for performing an operation when receiving an instruction from the instruction device.

The instruction device used in combination with the execution device is configured to generate encrypted condition data by encrypting and encrypts condition data of a plain text which is data for specifying a condition to be satisfied when or before or after the instruction is transferred to the execution device, and transfer the encrypted condition data to the execution device.

In addition, the execution device comprises: reception means for receiving the encrypted condition data; decryption means for decrypting the encrypted condition data to return the encrypted condition data to the condition data; determination means for determining whether the condition specified by the condition data is satisfied; and execution means for executing a first operation that is only one predetermined type of operation as the operation when the determination means determines that the condition specified by the condition data is satisfied.

According to consideration of the inventor of the present application, particularly when the execution device performs only one type of operation, it is almost impossible to prevent a man in the middle attack.

The one type of operation means, for example, that an operation to be executed based on an instruction from the instruction device by the execution device is to "recognize it as being authentic by authentication", "unlock the lock" or the like, and it is not an operation of selecting one type of operation from a plurality of types.

For example, a case where a user pays from his/her bank account to another person's bank account in the Internet banking is considered. In this case, the user instructs an instruction to a bank server for settling an account (which corresponds to the execution device referred to in the invention of the present application) by means of a user's own terminal (for example, a smartphone, which corresponds to the instruction device referred to in the invention of the present application). In this case, it is needless to say that the processing to be performed by the bank server is not limited to one type. More specifically, the processing to be performed by the bank server in response to an instruction from the user terminal is not limited to the payment as described above, but includes balance inquiry, detailed history inquiry, and the like, so that the processing to be performed by the bank server is more diverse. Description is returned to the story. The processing to be performed by the bank server for payment has various variations at least with respect to a payment source, a payee, and a payment amount. In other words, in this case, even if it is assumed that a user who requests payment or a bank account of a user who is a payment source has already been specified, an instruction transferred from the user terminal to the bank includes at least information for specifying a payee, and information for specifying a payment amount. Since the processing to be performed by the bank server changes according to these two pieces of information, in this example, the operation to be executed by the bank server as an example of the execution device is not limited to one type.

By the way, in such processing, it is possible in some cases to prevent the man in the middle attack. That is the case where the above instruction is completely (unbreakably) encrypted. When a malicious third party attempts to steal and misuse the data of the above instruction transferred over the Internet, it is necessary at least to rewrite the information for specifying the payee included in the above instruction to a payee that is convenient for the malicious third party, and it is more preferable that the payment amount included in the above instruction is also rewritten to a payment amount convenient for the malicious third party. However, in the case where a malicious third party rewrites the information for specifying the payee included in the above instruction to a payee convenient for the malicious third party and then encrypts the information according to an encryption method used between the user terminal and the bank server, this is impossible if the encryption is perfect. As described above, when there are variations in the operation to be executed by the execution device, there is a possibility that the man in the middle attack can be eliminated by an advanced cryptographic technique. In other words, in the case where there are variations in operation to be executed by the execution device, and an instruction with which the instruction device causes the execution device to execute an operation includes information for specifying an operation to be executed by the execution device from variations in operation, even when the malicious third party steals data relating to the instruction and merely transfers the data to the execution device with no modification, it is often impossible to cause the execution device to execute an operation desired by the malicious third party. As described above, it is difficult to prevent the man in the middle attack because the stolen information is used as it is, but it may be possible to prevent the man in the middle attack in such a case that stolen information cannot be used as it is and that there are variations in operation to be executed by the execution device.

On the other hand, in the case where the operation to be executed by the execution device in response to an instruction from the instruction device is only one type of operation, even when data to be transferred from the instruction device to the execution device contains something, an operation to be executed by the execution device when a malicious third party has stolen the data and transfers the data to the execution device is always one type of operation that has been intended. In such a case that rewriting of data is not necessary, there is generally no way to prevent the man in the middle attack.

However, according to the execution device of the invention of the present application, it is possible to prevent such a man in the middle attack.

As described above, the execution device according to the invention of the present application is a device that performs an operation when receiving an instruction from the instruction device, and is used in combination with an instruction device that is a device capable of transferring an instruction serving as a trigger for performing an operation. Although the execution device and the instruction device are not limited to the above devices, but they correspond to, for example, the locking device and the key device described in the Background Art, respectively.

The instruction device used in combination with the execution device generates encrypted condition data by encrypting condition data of a plain text which is data for specifying a condition to be satisfied when or before or after the instruction is transferred to the execution device, and transfers the encrypted condition data to the execution device, thereby performing an instruction.

The execution device is configured to receive the encrypted condition data by the reception means, and decrypt the received encrypted condition data by the decryption means to return the encrypted condition data to the condition data. The condition data is data for specifying a condition to be satisfied when or before or after an instruction is transferred to the execution device. The execution device determines whether the condition specified by the condition data is satisfied when or before or after the instruction is transferred to the execution device. As a result, the execution means performs the first operation. The first operation to be executed in response to an instruction by the execution means is only one type of operation.

The execution device of the invention of the present application decrypts the encrypted condition data received from the instruction device. It is needless to say that the authenticity of the encrypted condition data may be determined based on other authentication data which has been attached to the encrypted condition data while encrypted or left as a plain text, but the execution device can perform the determination of authenticity based on whether the execution device can decrypt the encrypted condition data. In addition, the execution device determines whether a condition specified by condition data obtained by decrypting the encrypted condition data is satisfied. Here, the condition specified by the condition data is a condition that should be satisfied when or before or after an instruction is transferred to the execution device. Accordingly, even if a malicious third party has stolen encrypted condition data to be transferred from the instruction device to the execution device and attempts to cause the execution device to perform predetermined one operation by transferring the stolen encrypted condition data to the execution device, the malicious third party cannot cause the execution device to perform the predetermined one operation unless the malicious third party satisfies the above-mentioned condition specified by the condition data. As a result, according to the execution device of the invention of the present application, even when the operation to be executed by the execution device is only one type of operation, the man in the middle attack can be prevented.

In addition, in the invention of the present application, the encrypted condition data is transferred from the instruction device to the execution device. In this case, it is also possible to change the content of the condition data on an instruction device side. For example, it is possible to change the condition specified by the condition data according to each instruction device owned by each user, or to change the content of condition data used in an instruction device owned by a certain user, for example, every time a predetermined time has elapsed. In this case, when the malicious third party transfers the stolen encrypted condition data to the execution device and causes the execution device to execute an operation, it is difficult for the malicious third party to cause the execution device to perform the operation unless the malicious third party can decrypt the encrypted condition data.

It is assumed that conditions to be specified by condition data are limited to only two types. In that case, if the malicious third party does not know that any one of the above two types of conditions is specified by condition data, the malicious third party is forced to make a bet with a probability of ½ when attempting to cause the execution device to execute an operation by using the encrypted condition data.

There may be a malicious third party who thinks that betting is possible with a probability of ½. However, for example, when the number of types of conditions that can be specified by condition data further increases and thus the probability that a malicious third party can win the bet becomes smaller, or when the execution device is configured so that when a condition specified by condition data has not been satisfied, the execution device leaves the history thereof or sounds an alarm, it is believed that there does not virtually exit any malicious third party who challenges such a bad bet.

The first operation executed by the execution device may be any operation as long as it is only one type of operation. In other words, any product may be used as a product to which the execution device is applied. Application examples are shown below.

For example, the encrypted condition data that the instruction device transfers to the execution device may be a key. In this case, the execution device may be a lock, and the first operation to be executed by the execution means when the determination means determines that the condition specified by the condition data is satisfied may be unlocking. This is a case where the execution device is applied to a lock (for example, an electronic lock).

Further, the encrypted condition data that the instruction device transfers to the execution device may be authentication data. In this case, the execution device is an authentication device, and the first operation to be executed by the execution means when the determination means determines that the condition specified by the condition data is satisfied may be to authenticate that the authentication data is authentic. This is a case where the execution device is applied to an authentication device. One type of operation in this case is to determine that the authentication data is authentic. As a result of the determination, operations such as opening the gate as described in the Background Art, notification of success of authentication to a user, etc. with voice, light or the like may be performed by the authentication device or another device.

Further, the encrypted condition data that the instruction device transfers to the execution device may be authentication data. In this case, the execution device is a starting device for starting a predetermined power device, and the first operation to be executed by the execution means when the determination means determines that the condition specified by the condition data is satisfied may be to start the power device. This is a case where the execution device is applied to the starting device, for example, an ignition device for an automobile engine.

In the invention of the present application, encrypted condition data is transferred from the instruction device to the execution device. How to transfer the encrypted condition data from the instruction device to the execution device is free.

The transfer of the encrypted condition data may be performed, for example, by wired data transmission. The instruction device may include a transmission device for wirelessly transmitting the encrypted condition data, and the reception means may be a reception device for wirelessly receiving the encrypted condition data. In this case, the transfer of the encrypted condition data is performed by wireless data transmission.

Furthermore, the transfer of the encrypted condition data may be performed via the Internet or another network.

The instruction device includes a display capable of displaying an encryption image that is an image capable of specifying the encrypted condition data, and the reception means is imaging means capable of imaging the encryption image displayed on the display, and is adapted to receive the encrypted condition data from the instruction device by imaging the encryption image using the reception means which is the imaging means. In this case, the encrypted condition data is not transmitted from the instruction device to the execution device, but the execution device images the encryption image which is an image displayed on the instruction device, whereby it is possible for the instruction device to transfer the encrypted condition data to the execution device via the encryption image.

The execution means may be adapted to perform a second operation that is an operation different from the only one type of operation when the determination means determines that the condition is not satisfied.

As described above, the determination means determines whether the condition specified by the condition data is satisfied. When it is determined that such a condition is satisfied, the execution means performs the first operation.

When it is determined that the condition is not satisfied, the execution means may not perform any operation. Alternatively, when the determination means determines that the condition is not satisfied, the execution means may perform a second operation that is an operation different from the only one type of operation. When the condition specified by the condition data is not satisfied, the possibility that a malicious third party has stolen encrypted condition data and transfers the stolen encrypted condition data to the execution device to cause the execution device to perform the first operation is high. Accordingly, when the determination means determines that the condition is not satisfied, the execution means performs the second operation which is an operation different from the first operation, whereby it is possible to check the malicious third party. Such an operation is, for example, to record on a predetermined recording medium, a determination that the condition is not satisfied, or date and time, situation, etc. when encrypted condition data triggering the determination is transferred to the execution device, to sound an alarm, etc.

The second operation may be an operation in which an operation different from the first operation is added to the first operation. When the second operation is an operation in which in addition to the first operation, another operation is further added to the first operation. The execution means first executes the first operation. The case where the second operation is executed means a case where the probability that a malicious third party attempts to perform a man in the middle attack is high. The execution means first executes the first operation, whereby it is possible to cause the malicious third party to misunderstand that a man in the middle attack has succeeded or to relax his/her guard. In particular, when the second operation is disadvantageous to the malicious third party, for example, it is processing for clarifying the identity of the malicious third party by taking a picture of the malicious third party or the like, or processing for capturing and detaining the third party, it will be possible to restrain the third party who has relaxed his/her guard. For example, in the case where the execution device is a lock, when the execution device once unlocks the lock as the first operation and then automatically performs an operation of locking the lock as an operation subsequent to the first operation at a time when it is estimated that a third party has entered a space inside the door partitioned by the lock (for example, the time may be after 10 seconds, or after it has been confirmed by a certain sensor that the malicious third party has entered the space inside the door), and the lock is not unlocked again unless a predetermined procedure that cannot be known by the malicious third party is taken, it is possible to confine the malicious third party in the space inside the door (for example, the inside of the room when the door is a room door, or the inside of an automobile when the door is an automobile door). Regardless of whether a malicious third party is restrained in the space inside the door, when it is well known that such a mechanism exists in the execution device there, the malicious third party naturally avoids taking a risk of performing a man in the middle attack against such an execution device. This is significant in that it increases the probability of preventing a man in the middle attack before it happens.

The inventor of the present application also proposes a method to be executed by the execution device as one aspect of the invention of the present application. The effect thereof is equal to the effect of the execution device according to the invention of the present application. For example, it is as follows.

The method is a method to be implemented in an execution device that is used in combination with an instruction device which is a device capable of transferring an instruction serving as a trigger for performing an operation, and performs an operation when receiving an instruction from the instruction device.

The instruction device is configured to generate encrypted condition data by encrypting condition data of a plain text which is data for specifying a condition to be satisfied when or before or after the instruction is transferred to the execution device, and transfer the encrypted condition data to the execution device, thereby performing the instruction.

The method comprises: a reception step of receiving the encrypted condition data; a decryption step of decrypting the encrypted condition data to return the encrypted condition data to the condition data; a determination step of determining whether the condition specified by the condition data is satisfied; and an execution step for executing a first operation that is only one predetermined type of operation as the operation when the determination means determines that the condition specified by the condition data is satisfied, the steps being executed by the execution device.

The inventor of the present application also proposes, for example, a computer program for causing a general-purpose computer to function as the execution device of the present invention. For example, it is as follows.

The computer program for causing a predetermined computer to function as an execution device that is used in combination with an instruction device which is a device capable of transferring an instruction serving as a trigger for performing an operation, and performs an operation when receiving an instruction from the instruction device.

The instruction device is configured to generate encrypted condition data by encrypting condition data of a plain text which is data for specifying a condition to be satisfied when or before or after the instruction is transferred to the execution device, and transfer the encrypted condition data to the execution device, thereby performing the instruction.

The computer program causes the computer to execute: a reception step of receiving the encrypted condition data; a decryption step of decrypting the encrypted condition data to return the encrypted condition data to the condition data; a determination step of determining whether the condition specified by the condition data is satisfied; and an execution step for executing a first operation that is only one predetermined type of operation as the operation when the condition specified by the condition data is satisfied in the determination step.

The inventor of the present application also proposes an instruction device used in combination with the execution device according to the invention of the present application as one aspect of the invention of the present application. The effect by the instruction device is the same as the effect by the execution device according to the invention of the present application.

An example of the instruction device is an instruction device that is a device capable of transferring an instruction serving as a trigger for performing an operation, and is used in combination with an execution device that performs an operation when receiving an instruction from the instruction device. The instruction device comprises: condition data generation means for generating condition data of a plain text which is data for specifying a condition to be satisfied when or before or after the instruction is transferred to the execution device; encryption means for encrypting the condition data to generate encrypted condition data; and instruction means for performing the instruction by transferring the encrypted condition data to the execution device.

Note that it is apprehended that the condition data generation means in the present application has a function of generating condition data not only when it has a function of generating new condition data, but also when it merely reads out condition data recorded in a predetermined recording medium.

Of course, the condition data generation means may have a function of generating new condition data. In this case, the instruction device includes input means for inputting data for generating the condition data, and the condition data generation means may generate the condition data according to an input from the input means.

The inventor of the present application also proposes a method to be executed by an instruction device as one aspect of the present invention. The effect thereof is equal to the effect of the instruction device according to the invention of the present application. For example, it is as follows.

The method is implemented by an instruction device that is a device capable of transferring an instruction serving as a trigger for performing an operation, and is used in combination with an execution device that performs an operation when receiving an instruction from the instruction device.

The method comprises: a condition data generation step of generating condition data of a plain text which is data for specifying a condition to be satisfied when or before or after the instruction is transferred to the execution device; an encryption step of encrypting the condition data to generate encrypted condition data; and an instruction step of performing the instruction by transferring the encrypted condition data to the execution device, the steps being executed by the instruction device.

The inventor of the present application also proposes a computer program for causing, for example, a general-purpose computer to function as the instruction device of the invention of the present application. For example, it is as follows.

The computer program causes a predetermined computer to function as an instruction device that is a device capable of transferring an instruction serving as a trigger for performing an operation and used in combination with an execution device that performs an operation when receiving an instruction from the instruction device.

The computer program causes the computer to execute: a condition data generation step of generating condition data of a plain text which is data for specifying a condition to be satisfied when or before or after the instruction is transferred to the execution device; an encryption step of encrypting the condition data to generate encrypted condition data; and an instruction step of performing the instruction by transferring the encrypted condition data to the execution device.

DESCRIPTION OF EMBODIMENTS

Hereinafter, first to third embodiments of the present invention will be described. In the description of each embodiment and modification, the same reference signs are assigned to the same objects, and duplicative description thereof is omitted in some cases.

First Embodiment

Figure 1:
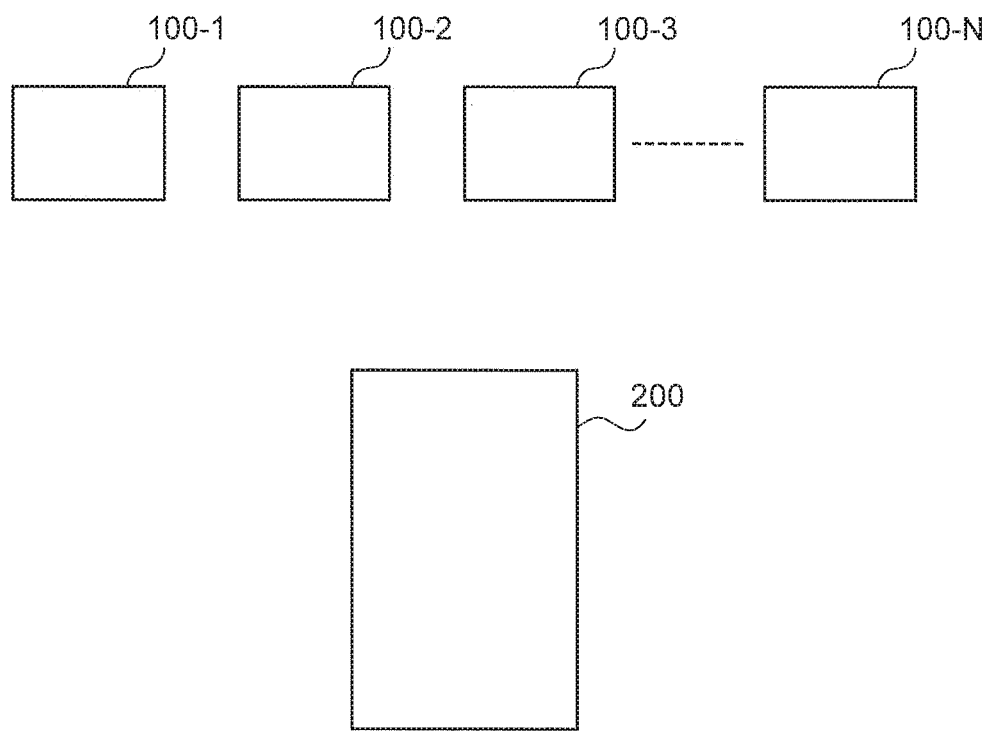
FIG. 1 is a diagram showing an overall configuration of a security gate system according to a first embodiment.

FIG. 1 schematically shows an overall configuration of a security gate system according to a first embodiment.

The security gate system in the embodiment includes a large number of admission cards 100-1 to 100-N (hereinafter also referred to as "admission card 100" simply), and a security gate apparatus 200.

The admission card 100 is an example of an instruction device of the present invention, and the security gate apparatus 200 includes an example of an execution device of the present invention therein. The security gate system is a system for allowing only a person possessing an authentic admission card 100 and having a qualification for passage through the security gate apparatus 200 to pass the security gate apparatus 200. The security gate apparatus 200 is installed and used for example, at an entrance to a building or an entrance to a lot. In the present application, it is assumed that the security gate apparatus 200 is placed at an entrance to a building, and the admission card 100 is possessed by a person who is permitted to enter the building.

When an admission card has been stolen, a general security gate system cannot prevent an unauthorized person having illegally obtained the admission card from passing through the security gate apparatus illegally. According to the security gate system described below, it is possible to prevent the above-described man in the middle attack that cannot be prevented by a general security gate system.

Each user possesses an admission card 100. The admission card 100 is issued by an administrator of the security gate system or the security gate apparatus 200, and possessed by each person who can enter the building in which the security gate apparatus 200 is installed.

Next, a configuration of the admission card 100 will be described. The configurations of respective admission cards 100-1 to 100-N are the same in relation to the present invention.

The admission card 100 is a publicly-known or well-known IC card although they are not shown in figures.

The IC card may be of a contact type or a non-contact type, but in the present embodiment, it is assumed to be of a contact type.

Figure 2:
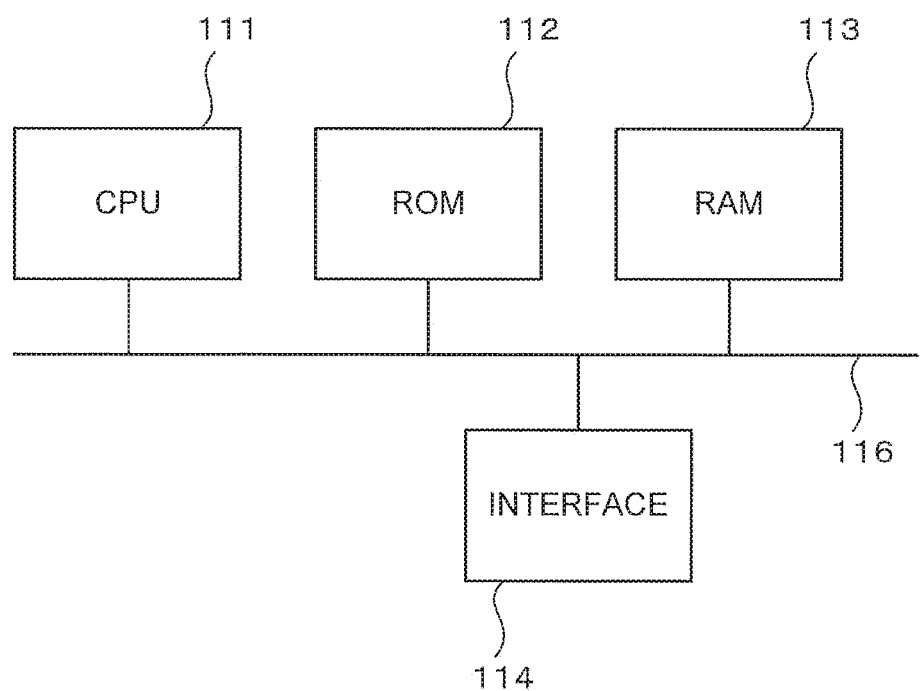
FIG. 2 is a diagram showing a hardware configuration of an IC chip included in an admission card in a security gate system shown in FIG. 1.

An IC chip is embedded in the admission card 100 which is an IC card. It may be a publicly-known or well-known card, and a hardware configuration thereof is shown in FIG. 2.

The hardware includes CPU (central processing unit) 111, ROM (read only memory) 112, RAM (random access memory) 113, and an interface 114, which are mutually interconnected by a bus 116.

The CPU 111 is an arithmetic unit for performing arithmetic operations.

The CPU 111 executes processing described later by executing a computer program recorded in the ROM 112, for example. Note that the computer program described here includes at least a computer program for causing the admission card 100 to function as an instruction device of the present invention. This computer program is generally pre-installed in the admission card 100, but may be installed afterwards if possible.

The ROM 112 records computer programs and data which are necessary for the CPU 111 to execute processing to be described later.

The RAM 113 provides a work area which is necessary for the CPU 111 to perform processing.

In the RAM 113 are recorded data such as a user ID and condition data described later.

Data transmission and reception is performed via the interface 114 between the external and the CPU 111, the RAM 113, etc. which are connected via a bus 116. Although not shown in figures, the interface 114 is connected to a publicly-known or well-known admission card electrode exposed on the surface of the admission card 100. Data described later, which have been sent from the security gate apparatus 200 to the admission card electrode, are set to be sent to the interface 114, and then sent from the interface 114 to the CPU 111 and the like via the bus 116. Furthermore, data described later which have been sent from the CPU 111 or the like to the interface 114 is set to be sent from the interface 114 to the admission card electrode, and then sent from the admission card electrode to the security gate apparatus 200.

Figure 3:
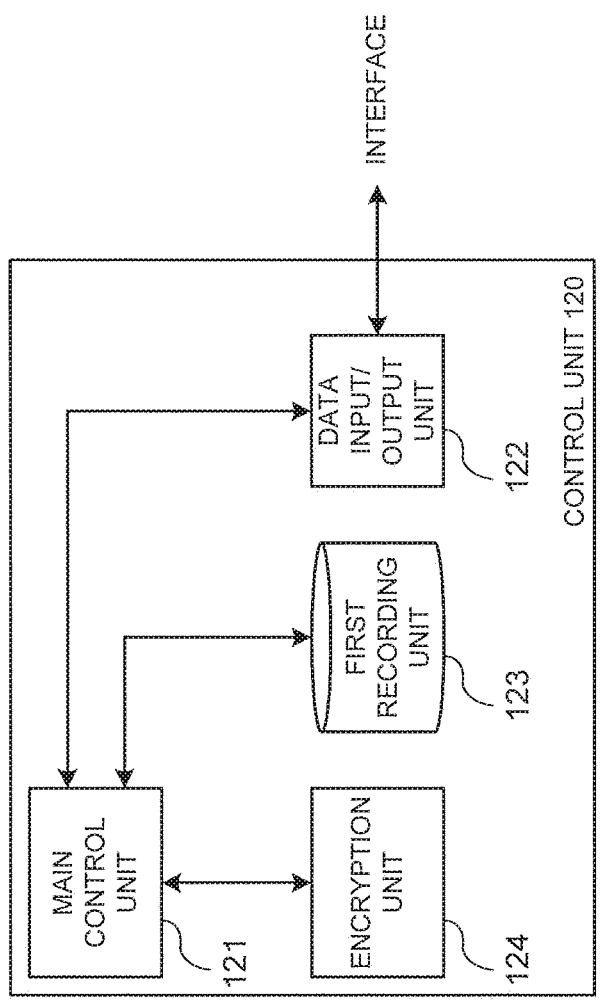
FIG. 3 is a block diagram showing functional blocks generated inside the admission card included in the security gate system shown in FIG. 1.

The CPU 111 executes a computer program, whereby functional blocks as shown in FIG. 3 are generated inside the admission card 100. Note that the following functional blocks may be generated by the function of the above-described computer program alone for causing the admission card 100 to function as the instruction device of the present invention, but may be generated by cooperating the above-described computer program with OS and other computer programs which are installed in the admission card 100.

In the admission card 100, the following control unit 120 is generated in relation to the function of the invention of the present application. In the control unit 120 exits a main control unit 121, a data input/output unit 122, a first recording unit 123, and an encryption unit 124.

The control unit 120 executes information processing as described below.

The main control unit 121 performs overall control within the control unit 120. For example, in order to execute authentication processing described later, the main control unit 121 controls the other functional blocks based on start data received from the data input/output unit 122, which will be described in detail later.

For example, the main control unit 121 may receive, via the interface 114 and the data input/output unit 122, condition data which have obtained from a reader/writer (not shown) via the admission card electrode described above and will be described later. The main control unit 121 is adapted to record the condition data in the first recording unit 123.

Furthermore, the main control unit 121 is adapted to read out a user ID described later and the condition data from the first recording unit 123 upon reception of the start data as a trigger to generate authentication data, and transmit the generated authentication data to the encryption unit 124.

The main control unit 121 may receive encrypted authentication data described later from the encryption unit 124. When receiving the encrypted authentication data, the main control unit 121 is adapted to attach a user ID of plain text to the encrypted authentication data, and then transmit the encrypted authentication data having the user ID affixed thereto to the data input/output unit 122.

The data input/output unit 122 performs input/output of data to/from the control unit 120.

Specifically, the data input/output unit 122 may receive, via the interface 114, start data described later which is input from the security gate apparatus 200 via the foregoing admission card electrode and instructs start of authentication processing. When the start data is input, the data input/output unit 122 is adapted to transmit the start data to the main control unit 121.

Furthermore, encrypted authentication data to which a user ID is affixed may be transmitted from the main control unit 121 to the data input/output unit 122. The data input/output unit 122 that has received the encrypted authentication data transmits the received encrypted authentication data to the admission card electrode via the interface 114.

The first recording unit 123 records data. As described above, the condition data are recorded in the first recording unit 123 by the main control unit 121. As described later, the condition data may be rewritten as necessary. The condition data are data for specifying a condition to be satisfied when or before or after encrypted authentication data are transferred from the admission card 100 to the security gate apparatus 200. The content of the condition data will be described in detail later.

Furthermore, user IDs are recorded in the first recording unit 123. The user ID is a unique identifier for each admission card 100, and it consequently identifies each user. As a result, in such a security gate system, it is possible to distinguish a user who has attempted to enter the building or an admission card 100 used when the user has attempted to enter the building. When it is not necessary to distinguish which user has attempted to enter the building or which admission card 100 has been used in attempting to enter the building, such a user ID is not required. For example, the user IDs have been recorded in the first recording unit 123 since the admission card 100 was issued.

Although not limited to the following configuration, the first recording unit 123 is configured by a part of the RAM 113 when viewed as hardware.

Furthermore, the user IDs and the condition data recorded in the first recording unit 123 are read out by the main control unit 121 at a timing as described later.

The encryption unit 124 may receive authentication data from the main control unit 121. When the encryption unit 124 receives authentication data, the encryption unit 124 is adapted to encrypt the authentication data to generate encrypted authentication data. The encryption performed by the encryption unit 124 may or may not be different among the respective admission cards 100. Although not limited to the following manner, it is assumed in the present embodiment that the encryption performed by the encryption unit 124 in each admission card 100 is different among the admission cards 100. More specifically, it is assumed in the present embodiment that the encryption performed by the encryption unit 124 in the respective admission cards 100 uses the same algorithm, but uses different keys among the admission cards 100.

The encryption unit 124 is adapted to transmit the generated encrypted authentication data to the main control unit 121.

Next, the security gate apparatus 200 will be described.

A hardware configuration of the security gate apparatus 200 may be the same as the conventional one, and is publicly known or well known. The configuration will be briefly described.

Figure 4:
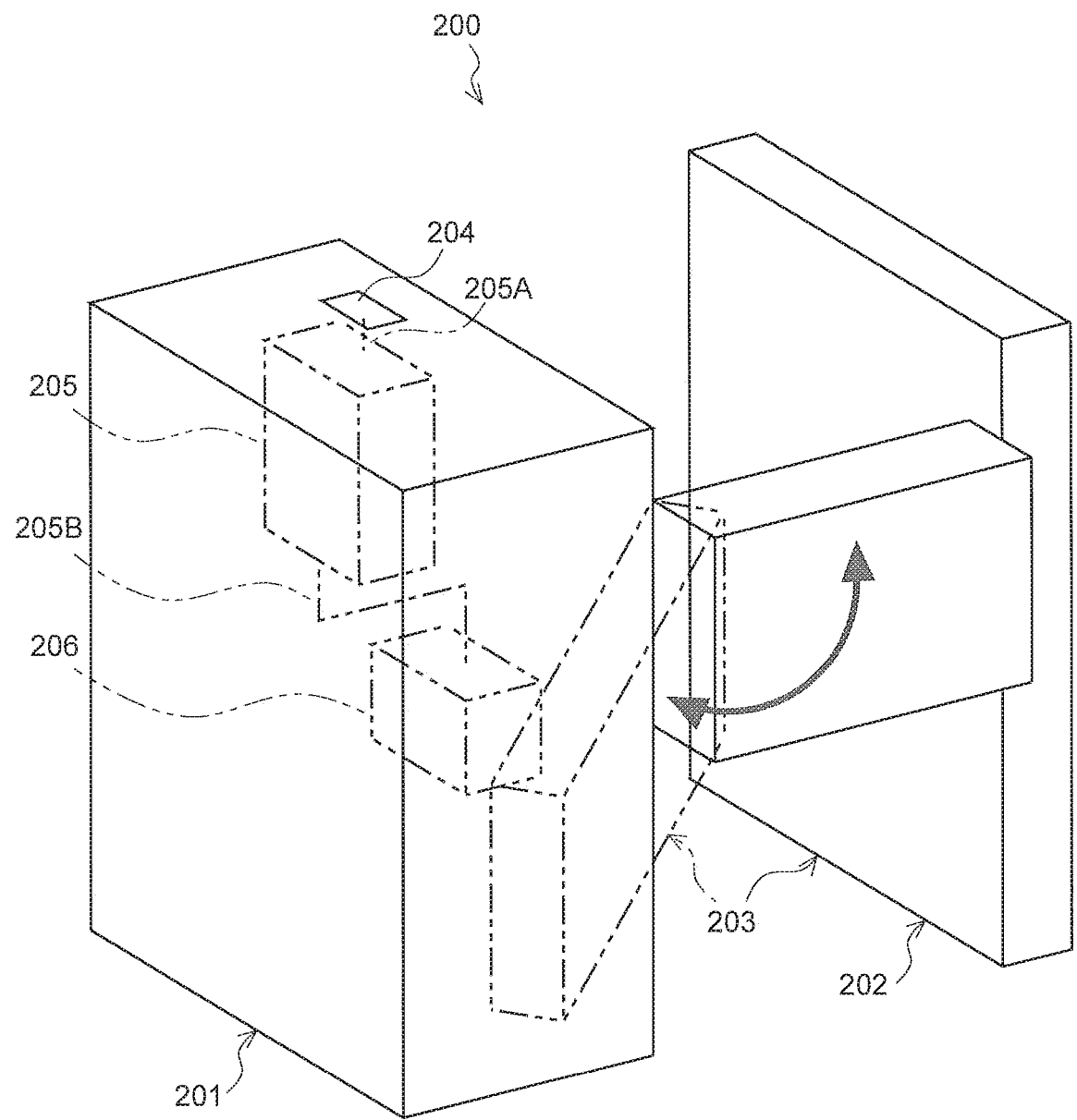
FIG. 4 is a diagram showing an appearance of a security gate apparatus included in the security gate system shown in FIG. 1.

The security gate apparatus 200 is configured to include main body portion 201 and an auxiliary portion 202, and both of them are plate-shaped. The main body portion 201 and the auxiliary portion 202 are arranged in parallel to each other, and the height thereof is about the height of an adult's waist. The main body portion 201 and the auxiliary portion 202 constitute a gate, and users pass between them. A gate plate 203 is connected to the main body portion 201. The gate plate 203 is a plate that is turnable between a closed position indicated by a solid line in FIG. 4 and an open position indicated by a two-dotted chain line. The gate plate 203 is configured so that when the gate plate 203 is in the open position, users can pass through the gate constituted by the main body portion 201 and the auxiliary portion 202, whereas when the gate plate 203 is in the closed position, the users cannot pass through the gate.

A gate electrode 204 is provided at an appropriate portion of the security gate apparatus 200, and although not limited to the following arrangement, in the present embodiment, it is provided on the upper surface of the main body portion 201. The gate electrode 204 is an electrode for exchanging data described later with the admission card 100.

A gate computer 205 configured by a computer is provided at an appropriate portion of the security gate apparatus 200, and although not limited to the following arrangement, in the embodiment, it is provided inside the main body portion 201. The gate computer 205 is connected to the gate electrode 204 by a conducting wire 205A. The gate computer 205 includes hardware as described later, and is configured to execute authentication processing as described later according to data input from the gate electrode 204.

A driving device 206 is provided at an appropriate portion of the security gate apparatus 200, and although not limited to the following arrangement, in the present embodiment, it is provided inside the main body portion 201. The driving device 206 generates power for rotating the gate plate 203, and is connected to the gate plate 203 via a publicly-known or well-known transmission mechanism (not shown). The driving device 206 is connected to the gate computer 205 by a conducting wire 205B. When opening data (described later) is transmitted from the gate computer 205, the driving device 206 places the gate plate 203, which is normally in the closed position, at an open position for a predetermined time sufficient for a user to pass through the gate. When the predetermined time has elapsed, the driving device 206 returns the gate plate 203 to the original closed position.

The gate computer 205 is a general computer. As a hardware configuration, it may be the same as that included in a computer included in the conventional security gate apparatus 200.

Figure 5:
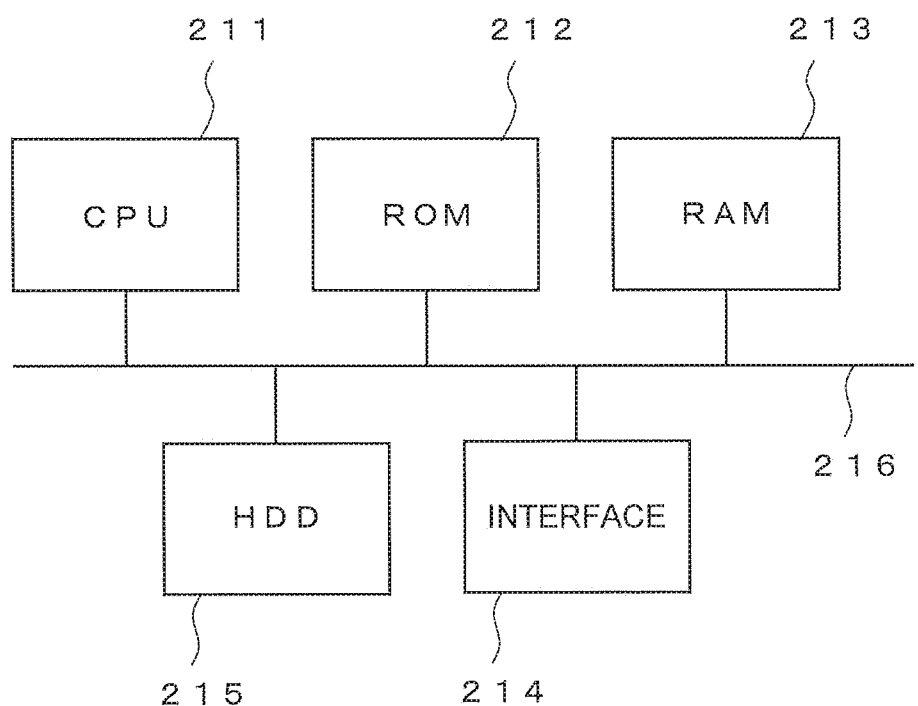
FIG. 5 is a diagram showing a hardware configuration of a gate computer included in the security gate apparatus of the security gate system shown in FIG. 1.

The hardware configuration of the gate computer 205 is shown in FIG. 5.

The hardware includes CPU 211, ROM 212, RAM 213, an interface 214, and a large-capacity recording medium that is HDD (hard disk drive) 215 in the present embodiment, and these are mutually connected to one other by a bus 216.

The CPU 211 is a computing device for performing computing operations.

For example, the CPU 211 executes processing described later by executing a computer program recorded in the ROM 212. Note that the computer program described here includes at least a computer program for causing the gate computer 205 to function as the execution device (authentication device) of the invention of the present application. This computer program may be preinstalled in the gate computer 205 or may be installed afterwards. The computer program may be installed in the gate computer 205 via a predetermined recording medium such as a memory card or via a network such as the Internet.

The ROM 212 records computer programs and data necessary for the CPU 211 to execute processing described later.

The computer programs recorded in the ROM 212 are not limited to the foregoing, and other necessary computer programs may be recorded.

The RAM 213 provides a work area necessary for the CPU 211 to perform processing.

The interface 214 is adapted to exchange data between the external and the CPU 211, RAM 213 and the like which are connected to one another via the bus 216. The interface 214 is connected to at least the gate electrode 204 and the driving device 206. Data described later which have received from the admission card 100 by the gate electrode 204 are received by the interface 214, and transmitted to the CPU 211, RAM 213 and the like. Furthermore, although not limited to the following configuration, in the present embodiment, a camera (not shown) described later may exist, and when the camera exists, image data from the camera is also input to the interface 214, and transmitted from the interface 214 to the CPU 211, RAM 213, and the like. The interface 214 may receive data described later from the CPU 211, the RAM 213, etc., and the data received by the interface 214 are transmitted to the gate electrode 204 or the driving device 206.

The HDD 215 is a large-capacity recording medium as described above, and records data.

At least a part of the computer program and data necessary for the CPU 211 to execute processing described later may be recorded in the HDD 215 instead of the ROM 212, and it is more practical that most of the computer program and the data are recorded in the HDD 215.

Figure 6:
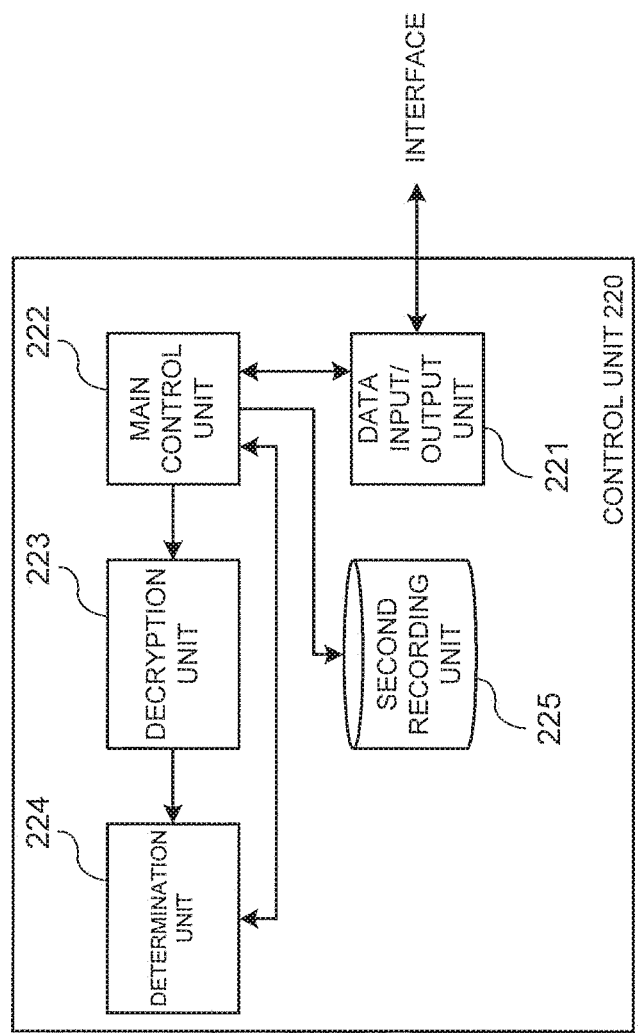
FIG. 6 is a block diagram showing functional blocks generated inside the gate computer included in the security gate apparatus of the security gate system shown in FIG. 1.

When the CPU 211 executes the computer program, functional blocks as shown in FIG. 6 are generated in the gate computer 205. Note that the following functional blocks may be generated by the function of the above-described computer program alone for causing the gate computer 205 to function as the execution device (authentication device) of the invention of the present application, but may be generated by cooperating the foregoing computer program with an OS and other computer programs installed in the gate computer 205.

The following control unit 220 is generated in the gate computer 205 in relation to the function of the invention of the present application. In the control unit 220 are generated a data input/output unit 221, a main control unit 222, a decryption unit 223, a determination unit 224, and a second recording unit 225.

The data input/output unit 221 inputs/outputs data to/from the control unit 220.

For example, the data input/output unit 221 is adapted to receive start data described later from the main control unit 222. Upon the reception of the start data, the data input/output unit 221 transmits the start data to the interface 214. The start data is transmitted from the interface 214 to the gate electrode 204, and then transmitted from the gate electrode 204 to the admission card 100.

Furthermore, the data input/output unit 221 may receive, from the gate electrode 204, encrypted authentication data having a user ID affixed thereto. The data input/output unit 221 that has received the encrypted authenticated data is adapted to transmit the user ID and the encrypted authentication data to the main control unit 222. Furthermore, the data input/output unit 221 may receive image data from the camera, and the data input/output unit 221 that has received the image data is adapted to transmit the image data to the main control unit 222.

The main control unit 222 performs overall control within the control unit 220.

For example, as described later, when the admission card electrode of the admission card 100 comes into contact with the gate electrode 204, the main control unit 222 is adapted to detect this contact via the interface 214 and the data input/output unit 221, and start to generate start data. The start data is transmitted from the main control unit 222 to the data input/output unit 221.

The encrypted authentication data having the user ID affixed thereto may be input from the data input/output unit 221 to the main control unit 222. The main control unit 222 that has received it is adapted to transmit, to the decryption unit 223, the encrypted authentication data having the user ID affixed thereto. In addition, image data captured by the camera may be input from the data input/output unit 221 to the main control unit 222. The main control unit 222 which has received the image data is adapted to transmit the image data to the determination unit 224.

The main control unit 222 may receive determination data described later from the determination unit 224 described above. Two types of determination data exit as described later, but when the main control unit 222 receives positive determination data described later, the main control unit 222 is adapted to generate opening data described in detail later based on the received positive determination data. When the main control unit 222 receives determination data regardless of the type, the main control unit 222 is adapted to record history data having contents described later in the second recording unit 225.

The decryption unit 223 has a function of decrypting encrypted authentication data when it receives the encrypted authentication data having the user ID affixed thereto from the main control unit 222. Encrypted authentication data are transmitted from a large number of admission cards 100 to the decryption unit 223. When the encrypted authentication data transmitted from the large number of admission cards 100 are encrypted, the same algorithm is used, but keys used for the encryption are different as described above. In order to decrypt the encrypted authentication data, the decryption unit 223 records the user IDs recorded in the first recording units 123 of all the admission cards 100 and the keys used by the encryption units 124 in the admission cards 100 having the user IDs affixed thereto while the user IDs and the corresponding keys are respectively linked to each other. How the decryption unit 223 decrypts the encrypted authentication data will be described later. When the decryption unit 223 performs decryption, the user ID and the key data which are associated with each other are used.

When the decryption unit 223 decrypts the encrypted authentication data, the encrypted authentication data returns to the authentication data. As described above, the authentication data includes the user ID and the condition data. These user ID and condition data are transmitted to the determination unit 224 together with the user ID affixed to the encrypted authentication data.

The determination unit 224 performs determination as to whether encrypted authentication data transmitted from an admission card 100 to the gate computer 205 is authentic, that is, a user possessing the admission card 100 that has transmitted the encrypted authentication data is allowed to pass through the gate. This determination will be referred to as authentication determination.

As described above, the determination unit 224 receives, from the decryption unit 223, the user ID derived from the encrypted authentication data, the condition data, and the user ID affixed to the encrypted authentication data, and also receives image data from the main control unit 222. By using these data, the determination unit 224 performs the authentication determination.

The details of the authentication determination executed by the determination unit 224 will be described later, and the determination unit 224 performs either positive determination indicating that the encrypted authentication data transmitted from the admission card 100 to the gate computer 205 is authentic, or negative determination indicating that the encrypted authentication data transmitted from the admission card 100 to the gate computer 205 is not authentic. Based on a determination result, the determination unit 224 generates positive or negative determination data, and transmits the generated determination data to the main control unit 222 in any case.

The second recording unit 225 is adapted to record history data. The content of the history data will be described later, and the history data are recorded in the second recording unit 225 by the main control unit 222.

Figure 7:
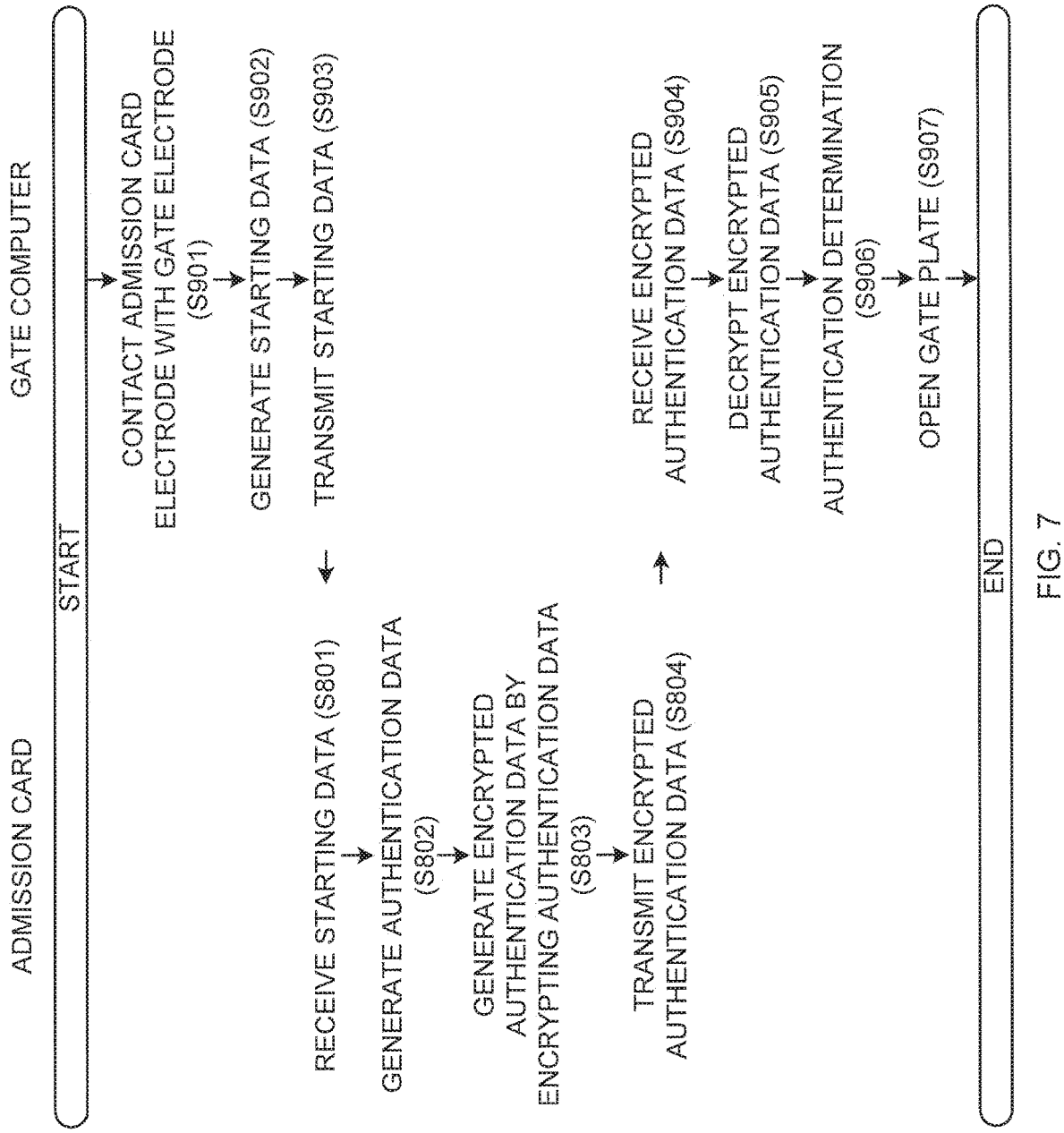
FIG. 7 is a diagram showing a flow of processing to be executed when a user passes through the security gate apparatus in the security gate system shown in FIG. 1.

Next, a using method and an operation of the security gate system as described above will be described with reference to FIG. 7.

When such a security gate system is used, for preliminary arrangement, an admission card 100 is distributed to each of a large number of users who are qualified to enter a building in each security gate apparatus 200 is placed.

A unique user ID has been recorded in advance for each admission card 100 in the first recording unit 123 of the admission card 100, and for example, the encryption unit 124 is provided with a unique key for each admission card 100. In addition, condition data is recorded in the first recording unit 123 of each admission card 100. The condition specified by the condition data may be different among the admission cards 100, or may be the same among all or some of the admission cards 100. Further, for example, the content of the condition data recorded in the first recording unit 123 of the admission card 100 may be rewritten every time a predetermined period has elapsed. The content of the condition data may be determined by a user possessing each admission card 100, or may be determined by an administrator of the security gate system or the like, and then notified to each user.

For example, the recording of the condition data in the first recording unit 123 is performed by writing the condition data from the reader/writer (not shown) to the admission card 100. The condition data is transmitted from the reader/writer to the admission card electrode, and further transmitted to the main control unit 121 via the interface 114 and the data input/output unit 122. The main control unit 121 records the condition data in the first recording unit 123, whereby the condition data has been recorded in the first recording unit 123. The change or update of the condition data may be performed in the same manner.

It is assumed that a user tries to enter a building where the security gate apparatus 200 is arranged. Note that a plurality of security gate apparatuses 200 may be arranged. In that case, all the security gate apparatuses 200 may be the same.

The user who is about to pass through the security gate apparatus 200 places the admission card 100 on the gate electrode 204 provided on the upper surface of the main body portion 201 of the security gate apparatus 200 so that the admission card electrode of the admission card 100 comes into contact with the gate electrode 204 (S901). As a result, the gate electrode 204 and the admission card electrode are electrically conducted to each other.

When the gate electrode 204 and the admission card electrode are electrically conducted to each other, the admission card electrode is supplied with power from the gate electrode 204. As a result, as publicly known or well known, the hardware of the admission card 100 is activated and the control unit 120 can be operated.

When the admission card electrode of the admission card 100 comes into contact with the gate electrode 204, the main control unit 222 detects it via the interface 214 and the data input/output unit 221. When performing such detection, the main control unit 222 generates start data (S902). The start data is data that prompts the admission card 100 to start the authentication processing.

The start data is transmitted from the main control unit 222 to the data input/output unit 221 and further transmitted to the interface 214. Further, the start data is transmitted from the interface 214 to the gate electrode 204 connected to the interface 214, and transmitted from the gate electrode 204 to the admission card electrode in contact with the gate electrode 204 (S903).

The admission card 100 receives start data at the admission card electrode (S801).

The start data is transmitted from the admission card electrode to the data input/output unit 122 via the interface 114, and further transmitted to the main control unit 121. The main control unit 121 which has received the start data generates authentication data (S802).

When receiving the start data, the main control unit 121 reads the user ID and the condition data from the first recording unit 123. It is assumed that the authentication data in this embodiment is a mere combination of the user ID and the condition data, but only the condition data is essential for the authentication data, and data other than the data described above may be added to the authentication data.

The main control unit 121 transmits the generated authentication data to the encryption unit 124.

When receiving the authentication data from the main control unit 121, the encryption unit 124 encrypts the received authentication data to obtain encrypted authentication data (S803). Different keys have been recorded in the encryption units 124 of the respective admission cards 100. The encryption unit 124 performs encryption by using an algorithm common to the respective admission cards 100 and also using a key recorded in the encryption unit 124 of each admission card 100.

The encryption unit 124 transmits the generated encrypted authentication data to the main control unit 121.

The main control unit 121 receives the encrypted authentication data from the encryption unit 124. When the main control unit 121 receives the encrypted authentication data, the main control unit 121 adds a user ID of a plain text to the encrypted authentication data, and then transmits, to the data input/output unit 122, the encrypted authentication data having the user ID affixed thereto.

The data input/output unit 122 transmits the encrypted authentication data having the user ID affixed thereto received from the main control unit 121 to the admission card electrode via the interface 114. The encrypted authentication data having the user ID affixed thereto is transmitted from the admission card electrode to the gate computer 205 (S804).

The gate computer 205 receives the encrypted authentication data by the gate electrode 204 that is in contact with the admission card electrode (S904). The encrypted authentication data having the user ID affixed thereto is transmitted from the gate electrode 204 via the interface 214 to the data input/output unit 221 of the control unit 220, and further transmitted to the main control unit 222.

When receiving the encrypted authentication data having the user ID affixed thereto from the data input/output unit 221, the main control unit 222 transmits the encrypted authentication data having the user ID affixed thereto to the decryption unit 223.

When receiving encrypted authentication data having the user ID affixed thereto from the main control unit 222, the decryption unit 223 decrypts the encrypted authentication data (S905). Encrypted authentication data are transmitted from a large number of admission cards 100 to the decryption unit 223.

As described above, the user IDs recorded in the first recording unit 123 for all the admission cards 100 and the keys used in the encryption units 124 of the admission cards 100 having the user IDs affixed thereto are recorded in the decryption unit 223 while they are linked to each other. Out of these keys, a key linked to the same user ID as a plain-text user ID affixed to encrypted authentication data transmitted from the main control unit 222 is used for decryption by the decryption unit 223. The decryption unit 223 uses the same algorithm as that used by the encryption unit 124 of the admission card 100, and uses the key specified by the user ID as described above, so that the decryption unit 223 can decrypt the encrypted authentication data which have been encrypted with different keys and are transmitted from a large number of admission cards 100.

Note that the description has been made on the present embodiment on the assumption that the method used when encryption is performed in the encryption unit 124 of one admission card 100 is always the same (for example, the key used when encryption is performed in the encryption unit 124 of one admission card 100 is always the same), and further the method used when decryption of encrypted authentication data transmitted from one admission card 100 is performed in the decryption unit 223 is always the same (for example, the key used when decryption of encrypted authentication data transmitted from one admission card 100 is performed in the decryption unit 223 is always the same). However, the key used when encryption is performed in the encryption unit 124 of one admission card 100 may be changed, and also the key used when decryption of encrypted authentication data transmitted from one admission card 100 is performed in the decryption unit 223 may be changed accordingly. Since such a technique is publicly known or well known, and in this case, a publicly-known or well-known technique may be applied.

When the decryption unit 223 decrypts the encrypted authentication data, the encrypted authentication data is returned to the authentication data. As described above, the authentication data includes the user ID and the condition data. These user ID and condition data are transmitted from the decryption unit 223 to the determination unit 224 together with the user ID affixed to the encrypted authentication data.

The determination unit 224 that has received the user ID and the condition data as the authentication data together with the user ID affixed to the encrypted authentication data from the decryption unit 223 performs authentication determination (S906). As described above, the authentication determination is a determination as to whether the encrypted authentication data transmitted from the admission card 100 to the gate computer 205 is authentic, that is, a user who possesses the admission card 100 transmitting the encrypted authentication data is allowed to pass through the gate.

Although not limited to the following manner, in the present embodiment, the determination is made based on the following two items.

First, a first item is as follows. In the first item, it is determined whether the user ID affixed to the encrypted authentication data coincides with the user ID that is a part of the authentication data. As a result, it is possible to check whether there is not any injustice in the step of encrypting authentication data into encrypted authentication data and the step of decrypting the encrypted authentication data into authentication data. In the determination for the first item, a positive determination is made when they are coincident with each other, and a negative determination is made when they are not coincident with each other.

Next, a second item is as follows. In the second item, it is determined whether a condition specified by condition data included in the authentication data is satisfied. In the determination for the second item, a positive determination is made when the condition is satisfied, and a negative determination is made when the condition is not satisfied.

This condition specifies a condition that should be satisfied when or before or after the encrypted authentication data are transmitted to the gate computer 205, which is the execution device of the present application. The condition specified by the condition data is a condition which a malicious third part cannot know if the malicious third part cannot decrypt the encrypted authentication data even in a case where the malicious third part has stolen the encrypted authentication data and provides the encrypted authentication data to the gate computer 205 by himself/herself and it is possible to satisfy when or before or after the encrypted authentication data are transmitted to the gate computer 205. Accordingly, even if a malicious third party steals encrypted authentication data and attempts to execute a man in the middle attack, no positive determination is made for the second item, so that the malicious third party cannot succeed in the man in the middle attack.

The condition specified by the condition data may be set to "the admission card 100 is shifted in a specific direction with respect to the user's viewpoint (for example, toward a near side in this example) after the admission card electrode and the gate electrode 204 are brought into contact with each other". The determination unit 224 determines whether this condition is satisfied. In order to make such a determination, for example, the above-described camera may be used. The camera captures a moving picture around the gate electrode 204, for example, from the moment when the admission card electrode and the gate electrode 204 are conducted to each other. As a result, the image data generated by the camera is transmitted to the determination unit 224 via the interface 214, the data input/output unit 221, and the main control unit 222. The determination unit 224 performs publicly-known or well-known image processing on the image data, and determines in which direction the user has been shifted the admission card 100 whose admission card electrode was brought into contact with the gate electrode 204. When the user has shifted the admission card 100 to the near side along the upper surface of the main body portion 201, the determination unit 224 determines that the condition specified by the condition data is satisfied, and thus makes a positive determination, whereas if the admission card 100 has been shifted in another direction, the determination unit 224 determines that the condition specified by the condition data is not satisfied, and thus makes a negative determination.

The condition specified by the condition data is not limited to the above condition, and it may include, for example, "the admission card 100 is shifted in a specific direction with respect to the user's viewpoint, and then the admission card electrode and the gate electrode 204 are brought into contact with each other", "the admission card 100 is once placed at the gate electrode 204 while reversely turned, and then the admission card electrode is brought into contact with the gate electrode 204", "a period of time when the admission card electrode and the gate electrode 204 have been brought into contact with each other is not less than 5 seconds", or "the admission card electrode and the gate electrode 204 are brought into contact with each other twice in succession". Whether these conditions are satisfied can be determined based on image data generated by the camera or information input from the gate electrode 204. If necessary, the camera may always capture a moving picture so that the image data of the moving picture continues to be generated regardless of whether the admission card electrode and the gate electrode 204 are in contact with each other, and the image data from the camera are always input to the determination unit 224. However, it is an example that the image data from the camera are input to the determination unit 224, and it is necessary that data necessary to make the above determination are input to the determination unit 224, whereby the determination unit 224 can determine whether the condition specified by the condition data has been satisfied. Note that "the admission card 100 is shifted in a specific direction with respect to the user's viewpoint after the admission card electrode and the gate electrode 204 are brought into contact with each other" out of the above examples is a condition to be satisfied after the encrypted authentication data are transmitted to the gate computer 205, "the admission card 100 is shifted in a specific direction with respect to the user's viewpoint, and then the admission card electrode and the gate electrode 204 are brought into contact with each other", and "the admission card 100 is once placed at the gate electrode 204 while reversely turned, and then the admission card electrode is brought into contact with the gate electrode 204" are conditions to be satisfied before the encrypted authentication data are transmitted to the gate computer 205, and "a period of time when the admission card electrode and the gate electrode 204 have been brought into contact with each other is not less than 5 seconds", and "the admission card electrode and the gate electrode 204 are brought into contact with each other twice in succession" are conditions to be satisfied when the encrypted authentication data are transmitted to the gate computer 205.

In the present embodiment, positive determination data is generated only when both the first item and the second item described above are positive, and negative determination data is generated when at least one of the first item and the second item is negative. Note that the determination unit 224 may make a determination based on only the second item. The fact that the decryption unit 223 has been able to decrypt the encrypted authentication data itself demonstrates that there is not any injustice in the step of encrypting the authentication data into the encrypted authentication data and the step of decrypting the encrypted authentication data into authentication data, so that it has been confirmed that the encrypted authentication data are legitimate (however, at this stage, there is a possibility that a man in the middle attack has been conducted). Therefore, even if the first item is omitted, no serious problem occurs in the reliability of the determination performed by the determination unit 224. Note that it is possible to adopt determinations other than the first item and the second item as a reference for the determination unit 224 to perform the determination.

The authentication determination is terminated here. In any case, the generated determination data is transmitted from the determination unit 224 to the main control unit 222.

The main control unit 222 receives determination data from the determination unit 224, and then executes processing as described below according to the determination data which has been generated as a result of the authentication determination.

When the determination data is positive, the main control unit 222 generates opening data. The opening data is information for instructing the driving device 206 to move the gate plate 203 from the closed position to the open position and keep this state for a predetermined time, and then return the gate plate 203 to an original position. The main control unit 222 transmits the generated opening data to the driving device 206 via the data input/output unit 221 and the interface 214. As a result, the driving device 206 temporarily moves the gate plate 203 from the closed position to the open position (S907). The user can pass through the security gate apparatus 200 while the gate plate 203 is in the open position.

When the determination data is negative, the main control unit 222 does not generate opening data, and the same applies to a case where it is impossible for the decryption unit 223 to decrypt the encrypted authentication data.

Therefore, since the gate plate 203 is not opened, the user cannot pass through the security gate apparatus 200. The security gate apparatus 200 may be provided with a mechanism for sounding an alarm or blinking a predetermined lamp to notify the neighbor of the presence of an act of injustice caused by a man in the middle attack when it is impossible to decrypt the encrypted authentication data or when the determination data is negative. For example, when an alarm is sounded, the main control unit 222 may generate data for giving such an instruction to an alarm device, and the data may be transmitted to the alarm device via the data input/output unit 221 and the interface 214. The same applies to a case where the lamp is blinked.

Whether the determination data is positive or negative, the main control unit 222 records, in the second recording unit 225, the content of the determination data as to whether the determination data is positive or negative, and a date at which the determination data has been transmitted, for example, to the main control unit 222, together with the user ID received earlier. As a result, records as to when and which user entered and when an unauthorized entry was attempted are left in the second recording unit 225.

Second Embodiment

In a second embodiment, an electronic locking system will be described.

The electronic locking system can be used, for example, as a lock of an entrance door of a building, or a lock of a door of a room in a building, a lock of a door of an automobile or the like. In the present embodiment, the following description will be made on the assumption that the electronic locking system is a lock of a door of a hotel room.

The electronic locking system is configured by a key device and a locking device.

The key device is positioned to be similar to the admission card 100 in the first embodiment, and the locking device is positioned to be similar to the security gate apparatus 200 in the first embodiment.

The key device is portable equipment that can be carried by a user. The key device may be a dedicated device, but it is assumed in the present embodiment that the key device is configured by a commercially available general-purpose computer. More specifically, in the present embodiment, the key device can be configured by a smartphone, a tablet, or the like. The smartphone is, for example, a product of an iPhone (trademark) series manufactured and sold by Apple Japan LLC. An example of the tablet is a product of an iPad (trademark) series manufactured and sold by Apple Japan LLC. Although not limited to the following configuration, the following description will be made on the assumption that the key device in the present embodiment is configured by a smartphone.

Figure 8:
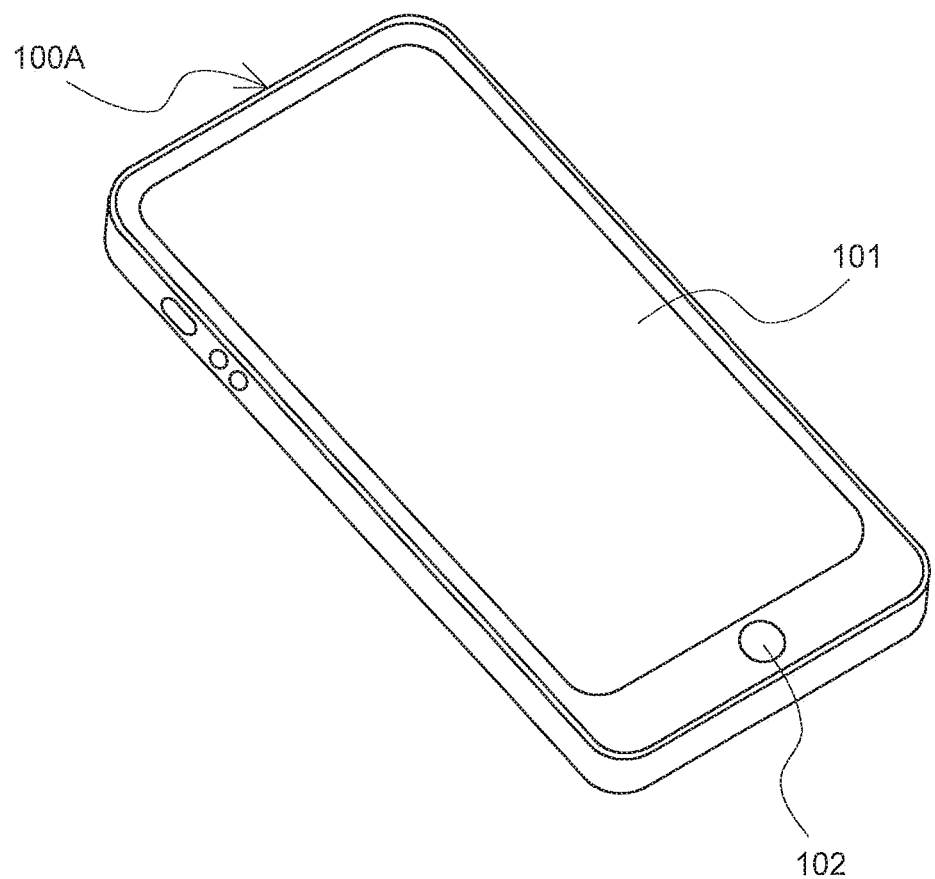
FIG. 8 is a perspective view showing an appearance of a smartphone as a key device included in an electronic locking system according to a second embodiment.

An example of the appearance of a key device 100A is shown in FIG. 8.

The key device 100A includes a display 101. The display 101 serves to display a still image or a moving picture, and a publicly-known or well-known display may be used. The display 101 is, for example, a liquid crystal display. The key device 100A also includes an input device 102. The input device 102 is used to make a desired input to the key device 100A by a user. A publicly-known or well-known input device may be used as the input device 102. The input device 102 of the key device 100A in the present embodiment is of a button type. However, it is not limited to this type, and a numeric keypad or the like may also be used. When the display 101 is a touch panel, the display 101 also functions as the input device 102, and this is the case in the present embodiment.

Data input from the input device 102 are, for example, condition data.

The hardware configuration of the key device 100A is the same as shown in FIG. 2, and the illustration thereof is omitted. However, it is the same as that of the IC chip of the admission card 100 in the first embodiment.

The hardware includes CPU, ROM, RAM, and an interface, which are connected to one another by a bus.

The functions of the CPU, ROM, RAM, interface, and bus are basically the same as those of the IC chip of the admission card 100 of the first embodiment.

However, although the interface 114 in the first embodiment is connected to the admission card electrode, the interface of the key device 100A in the second embodiment is connected to the display 101 and the input device 102, and also connected to a first communication mechanism (not shown) that performs wireless communication. The interface is configured to output data from the CPU, etc. to the display 101 or the first communication mechanism, and also transmit data from the input device 102 to the CPU, etc.

Note that in addition to a computer program for causing the smartphone to function as the key device 100A, a browser for performing telephone communication for causing the smartphone to function as a smartphone and browsing homepages via the Internet, etc. are recorded in ROM.

Although not shown in figures, execution of the computer program by the CPU generates, in the smartphone as the key device 100A, functional blocks as shown in FIG. 3 which are similar to the functional blocks generated in the admission card 100 of the first embodiment. As in the case of the first embodiment, such functional blocks may be generated by the above-described computer program alone for causing the smartphone to function as the key device 100A, or may be generated in cooperation with other computer programs.

As in the case of the generation in the admission card 100, a control unit 120 (the same reference sign in FIG. 3 is cited) is generated in the key device 100A in relation to the function of the invention of the present application. The control unit 120 includes a main control unit 121, a data input/output unit 122, a first recording unit 123, and an encryption unit 124.

The functions of the control unit 120 or the functions of the main control unit 121, the data input/output unit 122, the first recording unit 123, and the encryption unit 124 included in the control unit 120 are basically the same as those in the first embodiment. In particular, the main control unit 121 is partially different in function from the main control unit 121 in the first embodiment. This point will be described later.

Next, the locking device will be described.

Figure 9:
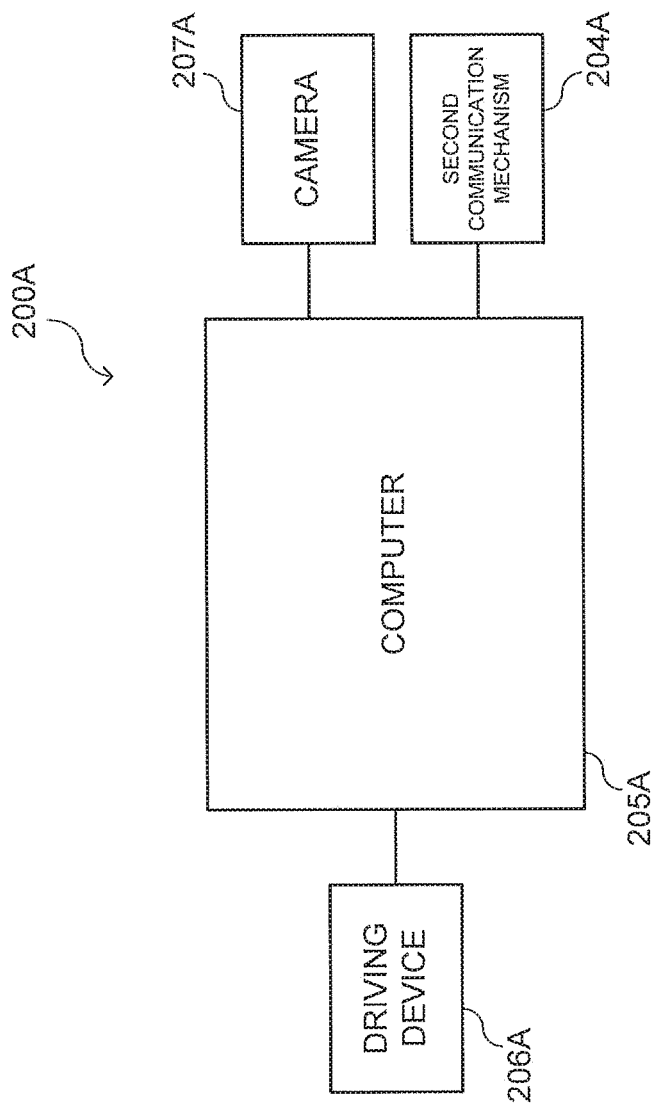
FIG. 9 is a block diagram showing a schematic configuration of a locking device included in an electronic locking system according to the second embodiment.

FIG. 9 shows a schematic configuration of a locking device 200A.

The locking device 200A is attached to a door, for example, and includes a computer 205A having the same function as the gate computer 205 in the security gate apparatus 200. The computer 205A is connected to a second communication mechanism 204A and a camera 207A, and is also connected to a driving device 206A.

The computer 205A in the locking device 200A controls the driving of the driving device 206A like the case where the gate computer 205 in the security gate apparatus 200 in the first embodiment controls the driving of the driving device 206. The driving device 206A unlocks a door key. Note that although not limited to the following configuration, the lock in the locking device 200A of the present embodiment adopts a so-called publicly-known or well-known auto-lock mechanism. Therefore, the door is locked automatically by the lock when the door is closed.

The camera 207A is embedded in, for example, a door, and is configured to generate moving picture data by capturing a moving picture of a predetermined range in front of the door. The second communication mechanism 204A is configured to perform wireless communication with the first communication mechanism. Any type of wireless communication may be used, and any of light, radio waves, and sound may be used. For example, the wireless communication may conform to the standard of the Bluetooth (trademark), but is not limited thereto. In the embodiment, this is the case.

The hardware configuration of the computer 205A is as shown in FIG. 5, and thus the illustration thereof is omitted. However, it is the same as that in the gate computer 205 in the first embodiment.

The hardware includes CPU, ROM, RAM, and an interface, which are connected to one another via a bus.

The functions of the CPU, ROM, RAM, interface, and bus are basically the same as those of the gate computer 205 of the second embodiment.

The interface 214 in the first embodiment is connected to the gate electrode 204 and the driving device 206, but the interface of the computer 205A in the second embodiment is connected to the second communication mechanism 204A, the camera 207A, and the driving device 206A. The interface is configured to output data from the CPU or the like to the driving device 206A, and transmit data from the camera 207A and the second communication mechanism 204A to the CPU or the like.

Note that a computer program for causing the computer 205A to execute processing described below, that is, a computer program for causing the computer 205A to function as a part of the locking device 200A is recorded in the ROM, the HDD, or the like.

Although not shown in figures, execution of the computer program by the CPU generates functional blocks as shown in FIG. 6 which are similar to the functional blocks generated in the gate computer 205 of the first embodiment are generated in the computer 205A. As in the case of the second embodiment, such functional blocks may be generated by the above-described computer program alone or may be generated in cooperation with other computer programs.

As in the case of the generation in the gate computer 205, the following control unit 220 (hereinafter, the same reference sign in FIG. 6 is cited) is generated in the locking device 200A in relation to the function of the invention of the present application. In the control unit 220 are generated a data input/output unit 221, a main control unit 222, a decryption unit 223, a determination unit 224, and a second recording unit 225.

The functions of the control unit 220 or the functions of the data input/output unit 221, main control unit 222, decryption unit 223, determination unit 224, and second recording unit 225 included in the control unit 220 are basically the same as those in the first embodiment. In particular, the main control unit 222 is partially different in function from the main control unit 222 in the first embodiment. This point will be described later.

A usage method and an operation of the electronic locking system in the second embodiment will be described. However, the usage method and the operation are substantially the same as the usage method and the operation of the security gate system in the first embodiment.

A unique user ID is recorded for each key device 100A in the first recording unit 123 of the key device 100A of the electronic locking system. For example, a unique key is recorded for each key device 100A in the encryption unit 124. The above recording is automatically performed when the above-described computer program is installed, for example.

The user records condition data in the first recording unit 123 of the smartphone as the key device 100A possessed by the user. The generation and recording of the condition data may be performed when the locking device 200A is caused to perform unlocking, but it is more convenient to perform the generation and recording of the condition data in advance. The condition to be specified by the condition data is set by a user's operation on the input device 102. When the user operates the input device 102, the condition data is transmitted from the input device 102 via the interface to the data input/output unit 122, and further transmitted to the main control unit 121. The main control unit 121 records the condition data in the first recording unit 123. As a result, the condition data is recorded in the first recording unit 123.

The user may also change or update the condition data at his or her preferred timing. Even in this case, the condition data may be changed or updated by operating the input device 102.

A case where a user unlocks the locking device 200A attached to the door of a hotel room will be described. In the present embodiment, the locking of the locking device 200A is automatically performed as described above.

When the user intends to unlock the locking device 200A, the user operates the input device 102 of the smartphone as the key device 100A to start the above-described computer program and perform an unlocking operation. At this time, the content of the operation is transmitted from the interface to the data input/output unit 122, and transmitted to the main control unit 121.

The main control unit 121 which has received this content generates authentication data. This corresponds to the processing of S802 in the first embodiment. In other words, in the second embodiment, the processing of S801 and the processing of S901 to S903 in the first embodiment are omitted.

When generating authentication data, the main control unit 121 reads a user ID and condition data from the first recording unit 123. A mere combination of the user ID and the condition data is assumed to be authentication data in the present embodiment. However, only the condition data is essential for the authentication data, and data other than the data described above may be added to the authentication data. The above is the same as in the first embodiment.

The main control unit 121 transmits the generated authentication data to the encryption unit 124.

When receiving the authentication data from the main control unit 121, the encryption unit 124 encrypts the authentication data into encrypted authentication data. This corresponds to the processing of S803 in the first embodiment.

Different keys are recorded in encryption units 124 of key devices 100A, respectively. The encryption unit 124 performs such encryption by using a common algorithm in each key device 100A and using a key recorded in the encryption unit 124 of each key device 100A.

The encryption unit 124 transmits the generated encrypted authentication data to the main control unit 121.

The main control unit 121 receives the encrypted authentication data from the encryption unit 124. When receiving the encrypted authentication data, the main control unit 121 transmits the encrypted authentication data to the data input/output unit 122. However, in the case of the second embodiment, it is not necessary to attach a user ID of a plain text to the encrypted authentication data.

The data input/output unit 122 transmits the encrypted authentication data received from the main control unit 121 to the first communication mechanism via the interface 114. The encrypted authentication data is transmitted from the first communication mechanism to the second communication mechanism 204A incorporated in the door or the like. This corresponds to the processing of S804 in the first embodiment.

The computer 205A receives the data through the second communication mechanism 204A. This corresponds to the processing of S904 in the first embodiment. The encrypted authentication data are transmitted from the gate electrode 204 through the interface 214 to the data input/output unit 221 of the control unit 220, and further transmitted to the main control unit 222.

When receiving the encrypted authentication data from the data input/output unit 221, the main control unit 222 transmits the encrypted authentication data to the decryption unit 223.

When receiving the encrypted authentication data from the main control unit 222, the decryption unit 223 decrypts the encrypted authentication data. This corresponds to the processing of S905 in the first embodiment.

It is intended that encrypted authentication data are transmitted from a large number of admission cards 100 to the decryption unit 223 of the first embodiment. However, it is intended that only encrypted authentication data from the key device 100A paired with the above locking device 200A are transmitted.

Therefore, unlike the case of the first embodiment, the decryption unit 223 does not need to select a key used to perform decryption of the encrypted authentication data from a large number of keys. The decryption unit 223 of the second embodiment has one key, and performs decryption processing by using the key.

When the decryption unit 223 has decrypted the encrypted authentication data, the encrypted authentication data returns to the authentication data. As described above, the authentication data includes the user ID and the condition data. These user ID and condition data are transmitted from the decryption unit 223 to the determination unit 224.

The determination unit 224 that has received the user ID and the condition data as the authentication data together with the user ID from the decryption unit 223 performs authentication determination. This corresponds to the processing of S906 in the first embodiment. The authentication determination is a determination as to whether the encrypted authentication data transmitted from the key device 100A to the computer 205A in the locking device 200A is authentic, that is, whether the driving device 206A in the locking device 200A is allowed to perform the unlocking processing.

Although not limited to the following manner, in this embodiment, the determination is made based on the following two items.

A first item will be first described. In the first item, it is determined whether the user ID held by the locking device 200A coincides with the user ID that is a part of the authentication data. In order to enable the foregoing determination, for example, the determination unit 224 of each locking device 200A holds the same user ID as that recorded in the first recording unit 123 of the key device 100A paired with the locking device 200A. In the determination for the first item, a positive determination is made when both the user IDs are coincident with each other, and a negative determination is made when both the user IDs are not coincident with each other.

Next, a second item will be described. As in the case of the first embodiment, the determination for the second item is performed by determining whether a condition specified by the condition data included in the authentication data is satisfied. In the determination for the second item, a positive determination is made when the condition is satisfied, and a negative determination is made when the condition is not satisfied.

As in the case of the first embodiment, this condition specifies a condition that should be satisfied when or before or after the encrypted authentication data are transmitted to the locking device 200A, which is the execution device of the present application.

The condition specified by the condition data may be set, for example, to "move or reverse a smartphone as the key device 100A in a specific direction with respect to the user's viewpoint (for example, toward a near side in this example) after the encrypted authentication data are transmitted from the key device 100A to the locking device 200A." The determination unit 224 determines whether this condition is satisfied. In order to perform such determination, for example, image data from the camera 207A described above may be used. The camera 207A captures a moving picture around a hand of the user standing in front of the door, for example, at all times or from the moment when it is detected by a motion sensor or the like that a person has approached the door. As a result, image data generated by the camera 207A are transmitted to the determination unit 224 via the interface 214, the data input/output unit 221, and the main control unit 222. The determination unit 224 performs publicly-known or well-known image processing on the image data to determine whether the above-described condition is satisfied.

Regardless of the foregoing condition, the condition specified by the condition data may be set to, for example, "transmit the encrypted authentication data from the key device 100A to the locking device 200A after causing the back side of the smartphone as the key device 100A to be once exposed to the camera 207A", or "transmit encrypted authentication data twice in succession". Whether these conditions are satisfied can be determined based on image data generated by the camera 207A or information input from the second communication mechanism 204A. Of course, it is an example that the image data from the camera 207A is input to the determination unit 224, and it is necessary that data necessary for making the above-described determination is input to the determination unit 224, which makes it possible for the determination unit 224 to determine whether the condition specified by the condition data is satisfied. For example, when it is intended to set such a condition that "a user performs an operation of moving a doorknob in an opening direction at a time when transmission of encrypted authentication data is performed, or within 2 seconds before or after the transmission time", it is necessary to provide a sensor for detecting such an operation to the doorknob and cause the sensor to input data relating to the operation of the doorknob to the computer 205A.

In the present embodiment, positive determination data is generated only when both the first item and the second item described above are positive, and negative determination data is generated when at least one of the first item and the second item is negative. Note that the determination unit 224 may make a determination based on only the second item.

The authentication determination has been terminated through the steps.

In any case, the generated determination data is transmitted from the determination unit 224 to the main control unit 222.

The main control unit 222 receives determination data from the determination unit 224, and then executes processing as described below according to the determination data generated as a result of the authentication determination.

When the determination data is positive, the main control unit 222 generates drive data based on an unlocking instruction attached to the encrypted authentication data, for example. The drive data is data for causing the driving device 206A to unlock the lock of the door. The drive data is transmitted to the driving device 206A via the data input/output unit 221 and the interface 214. The driving device 206A that has received the drive data unlocks the key of the door that has been locked until then. This corresponds to the processing of S907 in the first embodiment. When the key at the door is unlocked, the user can enter the room having the door provided with the locking device 200A of the hotel.

When the determination data is negative, the main control unit 222 does not generate unlock data, and the same applies to a case where it has been impossible to perform decryption on the encrypted authentication data in the decryption unit 223. Accordingly, the door lock is not unlocked as a result, so that a person who transmitted the encrypted authentication data to the locking device 200A cannot enter the room. As in the case of the first embodiment, the locking device 200A may be provided with a mechanism for sounding an alarm or blinking a predetermined lamp to notify the neighbor of the presence of an act of injustice caused by a man in the middle attack when the encrypted authentication data could not be decrypted or the determination data is negative. Further, after the main control unit 222 in the second embodiment once generates drive data as described above and transmits the drive data to the driving device 206A, the main control unit 222 may further generate different data and transmit the data to the driving device 206A, whereby after the driving device 206A has locked the door, the door can be prevented from being unlocked until predetermined processing is performed by a hotel employee, for example. In this case, the period of time from the time when the door lock has been unlocked until the door lock has been locked can be set to, for example, about 15 seconds. This period of time is a time which is so sufficient that a person who attempts to enter a hotel room illegally by performing a man in the middle attack enters the room, but so insufficient that the person leaves the room again. By locking the door of the hotel room at such a timing, a person who attempts to enter a hotel room illegally can be confined in the room.

Note that in the above example, when the encrypted authentication data is transmitted from the key device 100A to the locking device 200A through legitimate processing, that is, when positive determination data is generated, the drive data generated by the main control unit 222 causes the driving device 206A to perform unlock the lock. Furthermore, the drive data causes the driving device 206A to change the state of the lock. For example, the driving device 206A may be configured so that when the lock has been locked until then, the lock is unlocked, and when the lock has been released until then, the lock is locked. The drive data for causing the driving device 206A to perform both the operations may be the same.

In this case, it is natural that the lock provided to the door does not have a so-called auto-lock mechanism. Each time the user transmits the encrypted authentication data from the key device 100A to the locking device 200A of his/her own will, the user can alternately switch locking and unlocking of the lock from each other.

Further, encrypted authentication data transmitted from the key device 100A to the locking device 200A may further include unlocking data which is data for instructing the driving device 206A in the locking device 200A receiving the encrypted authentication data to unlock the door lock, or locking data which is data for instructing the driving device 206A receiving the encrypted authentication data to lock the door lock irrespective of whether the unlocking data or the locking data have been encrypted or not.

For example, it is assumed that the user selects to add the unlocking data to the encrypted authentication data and transmit the encrypted authentication data from the key device 100A to the locking device 200A. Such selection can be performed by operating the input device 102, and the main control unit 121 generates unlocking data based on the data input by the above operation. In this case, the unlocking data and the encrypted authentication data are transmitted to the main control unit 222 of the locking device 200A via the second communication mechanism 204A, the interface, and the data input/output unit 221. The processing after the main control unit 222 transmits the encrypted authentication data to the decryption unit 223 is as described above. When the main control unit 222 receives positive determination data from the determination unit 224, the main control unit 222 generates drive data based on the unlocking data so that the driving device 206A which has received the drive data unlocks the lock. Then, the driving device 206A that has received the drive data operates to unlock the lock regardless of whether the lock has been unlocked or locked in an immediately previous state.

On the other hand, it is assumed that the user selects to add the locking data to the encrypted authentication data and transmit the encrypted authentication data from the key device 100A to the locking device 200A. The locking data is generated by the main control unit 121 in the same manner as described above. In this case, the locking data and the encrypted authentication data are transmitted to the main control unit 222 of the locking device 200A via the second communication mechanism 204A, the interface, and the data input/output unit 221. The processing after the main control unit 222 transmits the encrypted authentication data to the decryption unit 223 is as described above. When the main control unit 222 receives positive determination data from the determination unit 224, the main control unit 222 generates drive data based on the locking data so that the driving device 206A that has received the drive data locks the lock. Then, the driving device 206A that has received the drive data operates to lock the lock regardless of whether the lock has been unlocked or locked in an immediately previous state.

As described above, the execution device of the present invention is used in combination with an instruction device that can transmit an instruction which serves as a trigger for performing an operation, and the execution device may be configured to select and perform one of a plurality of operations when receiving an instruction from the instruction device. In this case, the instruction device encrypts condition data of a plain text which is data for specifying a condition to be satisfied when or before or after an instruction is transmitted to the execution device, thereby generating encrypted condition data, and also transfers, to the execution device, the encrypted condition data together with operation selection information which is information for instructing an operation to be executed among a plurality of operations (corresponding to the unlocking data or the locking data in the above-mentioned example. The unlocking data or the locking data is not necessarily required to be a plain text, and it may be encrypted and may be contained in the encrypted condition data with being encrypted), thereby performing the instruction. The execution device in this case may be configured to include means for receiving the encrypted condition data, decryption means for decrypting the encrypted condition data and returning it to the condition data, determination means for determining whether a condition specified by the condition data has been satisfied, and execution means for executing an operation selected based on the operation selection information (when the operation selection information has been encrypted, decrypted operation selection information) when the determination means determines that the condition specified by the condition data has been satisfied.

In both of a case where the determination data is positive and a case where the determination data is negative, the main control unit 222 records, in the second recording unit 225, the content of the determination data as to whether the determination data is positive or negative, and the date and hour at which the determination data has been transmitted to, for example, the main control unit 222. Note that in this case, the recording of the user ID is unnecessary unlike the first embodiment. In the second embodiment, this processing to be performed by the main control unit 222 may be omitted.

Furthermore, the electronic locking system of the present embodiment can cause the driving device 206A to operate so as to unlock the lock regardless of whether the lock has been unlocked or locked in an immediately previous state or so as to lock the lock regardless of whether the lock has been unlocked or locked in an immediately previous state by using neither the unlocking data as described above nor the locking data as described above.

The foregoing can be implemented as follows.

The condition data in this case is data of a plain text for specifying a condition to be satisfied when or before or after encrypted condition data are transmitted from the key device 100A to the locking device 200A. The content of the condition data is set to specify two conditions which is a condition to be satisfied when unlocking of the lock is selected and a condition to be satisfied when locking of the lock is selected. In other words, not only a plurality of conditions, but also operations to be executed by the locking device 200A when these conditions are satisfied respectively are described in the condition data in this case while the conditions and the operations are respectively linked to each other. In this case, the conditions specified by the plurality of condition data are set to be different from one another, and the operations which are linked to the conditions respectively and should be performed by the locking device 200A are set to be different from one another. For example, the condition data is generated so that a content of "in the case of performing unlocking, move the key device 100A from side to side after encrypted condition data is transmitted" or a content of "when locking is performed, move the key device 100A up and down after encrypted condition data is transmitted" is a content to be specified by the condition data. In the former case, the operation to be executed by the locking device 200A is unlocking, and in the latter case, the operation to be executed by the locking device 200A is locking.

The decryption unit 223 that has received such condition data via the interface, the data input/output unit 221 and the main control unit 222 decrypts the encrypted condition data as described above. As a result, the encrypted condition data returns to the condition data of the plain text. The decryption unit 223 transmits the condition data to the determination unit 224. For example, based on an input from the camera 207A which is transmitted from the main control unit 222 as described above, the determination unit 224 makes a determination as to which one of the two conditions to be specified by the condition data is satisfied, or whether neither of the two conditions is satisfied. In this case, this determination is the determination for the second item described above. When any of the conditions is satisfied, the determination unit 224 makes the determination for the second item positive.

The determination unit 224 generates positive determination data and transmits it to the main control unit 222 only when both the first item and the second item have positive results. In other cases, the determination unit 224 generates negative determination data and transmits the negative determination data to the main control unit 222. Note that data relating to an operation which is linked to a condition satisfied for the second item and should be performed by the locking device 200A is added to the positive determination data.

The processing of the main control unit 222 when negative determination data is received, and the subsequent processing may be the same as those already described. On the other hand, when the main control unit 222 receives positive determination data, the main control unit 222 generates drive data for causing the driving device 206A to perform the operation added to the determination data. For example, it is assumed that the condition of "move the key device 100A from side to side after the encrypted condition data is transmitted" is satisfied in the determination for the second item by the determination unit 224. In that case, the operation associated with the condition is unlocking. Accordingly, the drive data generated by the main control unit 222 causes the driving device 206A to unlock the lock. Such drive data is transmitted from the main control unit 222 to the driving device 206A via the data input/output unit 221 and the interface. The driving device 206A which has received the drive data unlocks the lock according to the drive data.

According to the above manner, one of a plurality of operations that can be selected by the locking device 200A is arbitrarily selected to cause the locking device 200A to perform the operation without adding the encrypted condition data with information for selecting the operation.

As described above, the execution device of the present invention is used in combination with the instruction device that is a device capable of transmitting an instruction serving as a trigger to perform an operation, and it is configured as an execution device for selecting and executing one of a plurality of operations when receiving an instruction from the instruction device. In this case, the instruction device is adapted to encrypt data in which a plurality of condition data of plain texts for specifying different conditions each of which is to be satisfied when or before or after an instruction is transmitted to the execution device, and operation selection information which is information for specifying different operations each of which is to be performed when a condition specified by the condition data is satisfied are respectively linked to each other in one-to-one correspondence, thereby generating encrypted condition data, and transfer the encrypted condition data to the execution device, thereby performing an instruction. The execution device in this case includes reception means for receiving the encrypted condition data, decryption means for decrypting the encrypted condition data to return the encrypted condition data to the condition data, determination means for determining whether any one of the conditions to be specified by the condition data is satisfied, and execution means for executing, as an operation, an operation specified by operation selection information linked with condition data specifying a condition which is determined to be satisfied by the determination means when the determination means has determined that the condition specified by the condition data is satisfied.

<Modification>

An electronic locking system according to a modification is almost the same as the electronic locking system of the second embodiment.

In the electronic locking system of the second embodiment, the transfer of the encrypted authentication data from the key device 100A to the locking device 200A is performed by wireless communication between the first communication mechanism of the key device 100A and the second communication mechanism 204A of the locking device 200A. The electronic locking system of the modification is different from the electronic locking system of the second embodiment only in that the transfer is performed by an image as follows.

In the electronic locking system of the second embodiment, the main control unit 121 in the key device 100A that has received encrypted authentication data from the encryption unit 124 is adapted to transmit the encrypted authentication data from the data input/output unit 122 via the interface and the first communication mechanism to the second communication mechanism 204A of the locking device 200A.

Figure 10:
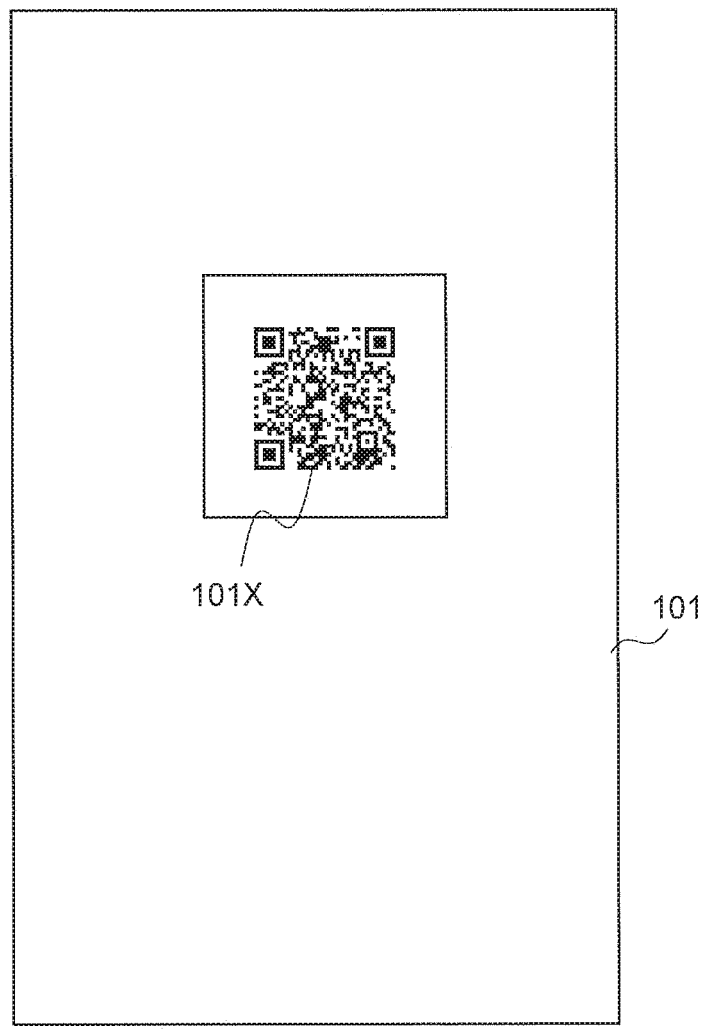
FIG. 10 is a diagram showing an example of an image to be displayed on a display of the smartphone shown in FIG. 8.

On the other hand, in the modification, the main control unit 121 in the key device 100A that has received encrypted authentication data from the encryption unit 124 generates, based on the encrypted authentication data, encryption image data as data relating to an encryption image which is an image capable of specifying the encrypted authentication data. The encryption image may be any image as long as the image can specify the encrypted authentication data from the encryption image according to a predetermined rule. For example, the encryption image may be set to a two-dimensional barcode. The main control unit 121 transmits the encryption image data to the display 101 via the data input/output unit 122 and the interface. For example, an encryption image 101X is displayed on the display 101 as shown in FIG. 10.

The user holds the display 101 of the smartphone serving as the key device 100A up to the camera 207A of the locking device 200A, and causes the camera 207A to capture an encryption image 101X displayed on the display 101.

Image data relating to an image including the encryption image is generated by the camera 207X, and input to the main control unit 222 of the locking device 200A via the interface and data input/output unit 221. The main control unit 222 of the locking device 200A according to the modification has a function of generating encrypted authentication data from an encryption image. The main control unit 222 generates or extracts the encrypted authentication data from the encryption image.

The processing of transmitting such encrypted authentication data from the main control unit 222 to the decryption unit 223 and subsequent processing thereto are the same as those of the second embodiment.

As described above, according to the modification, the encrypted authentication data can be transferred from the key device 100A to the locking device 200A without using the first communication mechanism and the second communication mechanism 204A.

Third Embodiment

A third embodiment relates to an ignition system.

However, the third embodiment is almost the same as the second embodiment.

The ignition system according to the third embodiment is configured to include a key device and an ignition device.

The key device according to the third embodiment corresponds to the key device 100A in the second embodiment, and more specifically, it can be configured to be identical to the key device 100A of the second embodiment. This is the case in the present embodiment, but the key device is not limited to the above configuration.

The ignition device according to the third embodiment is almost the same as the locking device 200A in the second embodiment, is configured as shown in FIG. 9, and is the same as the locking device 200A of the second embodiment except that the function of the driving device is different from the driving device 206A of the locking device 200A in the second embodiment. The ignition device according to the third embodiment is a device for starting a predetermined power device, for example, a device for starting an automobile engine as a power device mounted in an automobile. In this case, naturally, the ignition device is mounted on an automobile in which the power device is mounted.

In the most basic example, the driving device 206A according to the second embodiment is configured so as to unlock the lock when receiving, from the main control unit 222, the drive data generated by the main control unit 222 that has received the positive determination data. However, the driving device in the third embodiment is configured so as to drive the power device, for example, the engine of an automobile when receiving, from the main control unit, the drive data generated by the main control unit 222 that has received the positive determination data.

In the case of an automobile, the condition to be specified by the condition data for which the determination means makes a determination as to satisfiability may include, for example, "step on the brake pedal twice after encrypted authentication data has been transmitted from the key device 100A to the ignition device", "transmit encrypted authentication data from the key device 100A to the ignition device while stepping on the brake pedal", or "step on the accelerator pedal once before encrypted authentication data has been transmitted from the key device 100A to the ignition device". When these conditions are set, data indicating what operation is performed on the brake pedal or the accelerator pedal may be input from the brake pedal or the accelerator pedal to the determination unit 224. Since many members that can be operated are provided in the interior of an automobile, the operations of these members may be included in the conditions to be specified by the condition data without limiting to the brake pedal or the accelerator pedal.

The invention claimed is:

1. An execution device that is used in combination with a user hand-held instruction device as a device capable of transferring an instruction serving as a trigger for performing an operation, and performs an operation when receiving an instruction from the user hand-held instruction device, wherein the user hand-held instruction device is configured to generate encrypted condition data by encrypting condition data of a plain text which is data for specifying a condition relating to actions of a user to be satisfied when or before or after the instruction is transferred to the execution device, and transfer the encrypted condition data to the execution device, thereby performing the instruction, and wherein the execution device comprises:

reception means for receiving the encrypted condition data;

decryption means for decrypting the encrypted condition data to return the encrypted condition data to the condition data;

determination means for receiving, from an action data generating device for generating action data that is data specifying an action the user has actually performed, the action data being delivered when or before or after the instruction is transferred to the execution device and for determining whether the condition relating to actions of the user specified by the condition data is satisfied; and execution means for executing a first operation that is only one predetermined type of operation as the operation when the determination means determines that the condition relating to actions of the user specified by the condition data is satisfied.

2. The execution device according to claim 1, wherein the encrypted condition data that the user hand-held instruction device transfers to the execution device is a key, the execution device is a lock, and the first operation to be executed by the execution means when the determination means determines that the condition relating to actions of the user specified by the condition data is satisfied is unlocking.

3. The execution device according to claim 1, wherein the encrypted condition data that the user hand-held instruction device transfers to the execution device is authentication data, the execution device is an authentication device, and the first operation to be executed by the execution means when the determination means determines that the condition relating to actions of the user specified by the condition data is satisfied is to authenticate that the authentication data is authentic.

4. The execution device according to claim 1, wherein the encrypted condition data that the user hand-held instruction device transfers to the execution device is authentication data, and the execution device is a starting device for starting a predetermined power device, and the first operation to be executed by the execution means when the determination means determines that the condition relating to actions of the user specified by the condition data is satisfied is to start the power device.

5. The execution device according to claim 1, wherein the user hand-held instruction device includes a display capable of displaying an encryption image that is an image capable of specifying the encrypted condition data;
the reception means is imaging means capable of capturing the encryption image displayed on the display; and
the execution device is configured to receive the encrypted condition data from the instruction device by capturing the encryption image by the reception means that is imaging means.

6. The execution device according to claim 1, wherein the user hand-held instruction device includes a transmission device that wirelessly transmits the encrypted condition data, and the reception means is a reception device that wirelessly receives the encrypted condition data.

7. The execution device according to claim 1, wherein the execution means is adapted to perform a second operation that is an operation different from the only one type of operation when the determination means determines that the condition relating to actions of the user is not satisfied.

8. The execution device according to claim 7, wherein the second operation is an operation in which an operation different from the first operation is added to the first operation.

9. A method to be implemented in an execution device that is used in combination with a user hand-held instruction device that is a device capable of transferring an instruction serving as a trigger for performing an operation, and performs an operation when receiving an instruction from the user hand-held instruction device, wherein the instruction device is configured to generate encrypted condition data by encrypting condition data of a plain text which is data for specifying a condition relating to actions of a user to be satisfied when or before or after the instruction is transferred to the execution device, and transfer the encrypted condition data to the execution device, thereby performing the instruction, and wherein the method comprises:
a reception step of receiving the encrypted condition data;
a decryption step of decrypting the encrypted condition data to return the encrypted condition data to the condition data;
a determination step of receiving, from an action data generating device for generating action data that is data specifying an action the user has actually performed, the action data being delivered when or before or after the instruction is transferred to the execution device and of determining whether the condition relating to actions of the user specified by the condition data is satisfied; and
an execution step for executing a first operation that is only one predetermined type of operation as the operation when the determination means determines that the condition relating to actions of the user specified by the condition data is satisfied, the steps being executed by the execution device.

10. A user hand-held instruction device that is a device capable of transferring an instruction serving as a trigger for performing an operation, and is used in combination with an execution device that performs an operation when receiving an instruction from the user hand-held instruction device, wherein the instruction device comprising:
condition data generation means for generating condition data of a plain text which is data for specifying a condition relating to actions of a user to be satisfied when or before or after the instruction is transferred to the execution device;
encryption means for encrypting the condition data to generate encrypted condition data; and
instruction means for performing the instruction by transferring the encrypted condition data to the execution device,
wherein the execution device includes determination means for receiving, from an action data generating device for generating action data that is data specifying an action the user has actually performed, the action data being delivered when or before or after the instruction is transferred to the execution device and for determining whether the condition relating to actions of the user specified by the condition data is satisfied.

11. The instruction device according to claim 10, further comprising input means for inputting data for generating the condition data, wherein the condition data generation means is adapted to be capable of generating the condition data in response to an input from the input means.

12. A method to be implemented by a user hand-held instruction device that is a device capable of transferring an instruction serving as a trigger for performing an operation, and used in combination with an execution device that performs an operation when receiving an instruction from the user hand-held instruction device, comprising:
a condition data generation step of generating condition data of a plain text which is data for specifying a condition relating to actions of a user to be satisfied when or before or after the instruction is transferred to the execution device;
an encryption step of encrypting the condition data to generate encrypted condition data; and
an instruction step of performing the instruction by transferring the encrypted condition data to the execution device, the steps being executed by the user hand-held instruction device,
wherein the execution device operates with a determination step of receiving, from an action data generating device for generating action data that is data specifying an action the user has actually performed, the action data being delivered when or before or after the instruction is transferred to the execution device and of determining whether the condition relating to actions of the user specified by the condition data is satisfied.

* * * * *